United States Patent
Ryder et al.

(10) Patent No.: US 12,407,063 B2
(45) Date of Patent: Sep. 2, 2025

(54) FIRE MITIGATION SYSTEM FOR ENERGY STORAGE SYSTEMS

(71) Applicant: Fire & Risk Alliance, LLC, Rockville, MD (US)

(72) Inventors: Noah Lael Ryder, Rockville, MD (US); Brent Allen Turner, III, Rockville, MD (US); Ryan Alexander Hutchens, Rockville, MD (US); Anthony James Natale, Rockville, MD (US)

(73) Assignee: Fire & Risk Alliance, LLC, Derwood, MD (US)

( * ) Notice: Subject to any disclaimer, the term of this patent is extended or adjusted under 35 U.S.C. 154(b) by 522 days.

(21) Appl. No.: 17/843,212

(22) Filed: Jun. 17, 2022

(65) Prior Publication Data

US 2022/0407176 A1    Dec. 22, 2022

Related U.S. Application Data

(60) Provisional application No. 63/299,792, filed on Jan. 14, 2022, provisional application No. 63/212,240, filed on Jun. 18, 2021.

(51) Int. Cl.
*H01M 50/383*    (2021.01)
*A62C 3/16*    (2006.01)
(Continued)

(52) U.S. Cl.
CPC ............ *H01M 50/383* (2021.01); *A62C 3/16* (2013.01); *A62C 37/40* (2013.01);
(Continued)

(58) Field of Classification Search
CPC ............ H01M 10/482; H01M 10/486; H01M 10/613; H01M 10/6556; H01M 2200/10; H01M 2200/20; H01M 50/383; H01M 50/375; H01M 10/63; H01M 10/6568; H01M 50/209; H01M 50/569;
(Continued)

(56) References Cited

U.S. PATENT DOCUMENTS

2021/0249639 A1\*    8/2021    Shao .................. H01M 10/486

FOREIGN PATENT DOCUMENTS

WO    WO-2021136875 A1 \*    7/2021    ............... A62C 3/16

\* cited by examiner

*Primary Examiner* — Victoria H Lynch
(74) *Attorney, Agent, or Firm* — Run8 Patent Group, LLC; Peter Miller; Marissa Kohrman

(57) ABSTRACT

A system for mitigating fire within a battery storage container enclosing an energy storage system includes a sensor configured to detect a precursor condition indicative of a potential fire or explosion, a controller, and a set of extendable battery trays, each including a tray ejector and containing a set of battery cells. The controller detects a precursor condition in a battery tray via the sensor and ejects the battery tray to increase the distance between the battery tray and adjacent battery trays. The system can include a cooling channel in the battery tray configured to cool the set of battery cells, and/or a nozzle configured to direct fluid into the battery tray to suppress the precursor condition. In one variation, the system includes a door of the container configured to open, venting the interior of the container in response to detection of a precursor condition indicating a potential explosion.

19 Claims, 8 Drawing Sheets

(51) Int. Cl.
| | |
|---|---|
| *A62C 37/40* | (2006.01) |
| *H01M 10/48* | (2006.01) |
| *H01M 10/613* | (2014.01) |
| *H01M 10/63* | (2014.01) |
| *H01M 10/6556* | (2014.01) |
| *H01M 10/6568* | (2014.01) |
| *H01M 50/209* | (2021.01) |
| *H01M 50/578* | (2021.01) |
| *H01M 50/581* | (2021.01) |

(52) U.S. Cl.
CPC ....... *H01M 10/482* (2013.01); *H01M 10/486* (2013.01); *H01M 10/613* (2015.04); *H01M 10/63* (2015.04); *H01M 10/6556* (2015.04); *H01M 10/6568* (2015.04); *H01M 50/209* (2021.01); *H01M 50/578* (2021.01); *H01M 50/581* (2021.01); *H01M 2200/10* (2013.01); *H01M 2200/20* (2013.01)

(58) Field of Classification Search
CPC ... H01M 50/578; H01M 50/581; Y02E 60/10; A62C 3/16; A62C 35/60; A62C 35/68; A62C 37/40
See application file for complete search history.

FIRE MITIGATION SYSTEM FOR ENERGY STORAGE SYSTEMS

CROSS-REFERENCE TO RELATED APPLICATIONS

This Application claims priority to U.S. Provisional Application No. 63/212,240, filed on 18 Jun. 2021, and to U.S. Provisional Application No. 63/299,792, filed on 14 Jan. 2022, both of which are incorporated in their entireties by this reference.

TECHNICAL FIELD

This invention relates generally to the field of energy storage systems and more specifically to a new and useful system for mitigating and preventing the spread of fires within an energy storage system.

DESCRIPTION OF THE EMBODIMENTS

Figure 1:
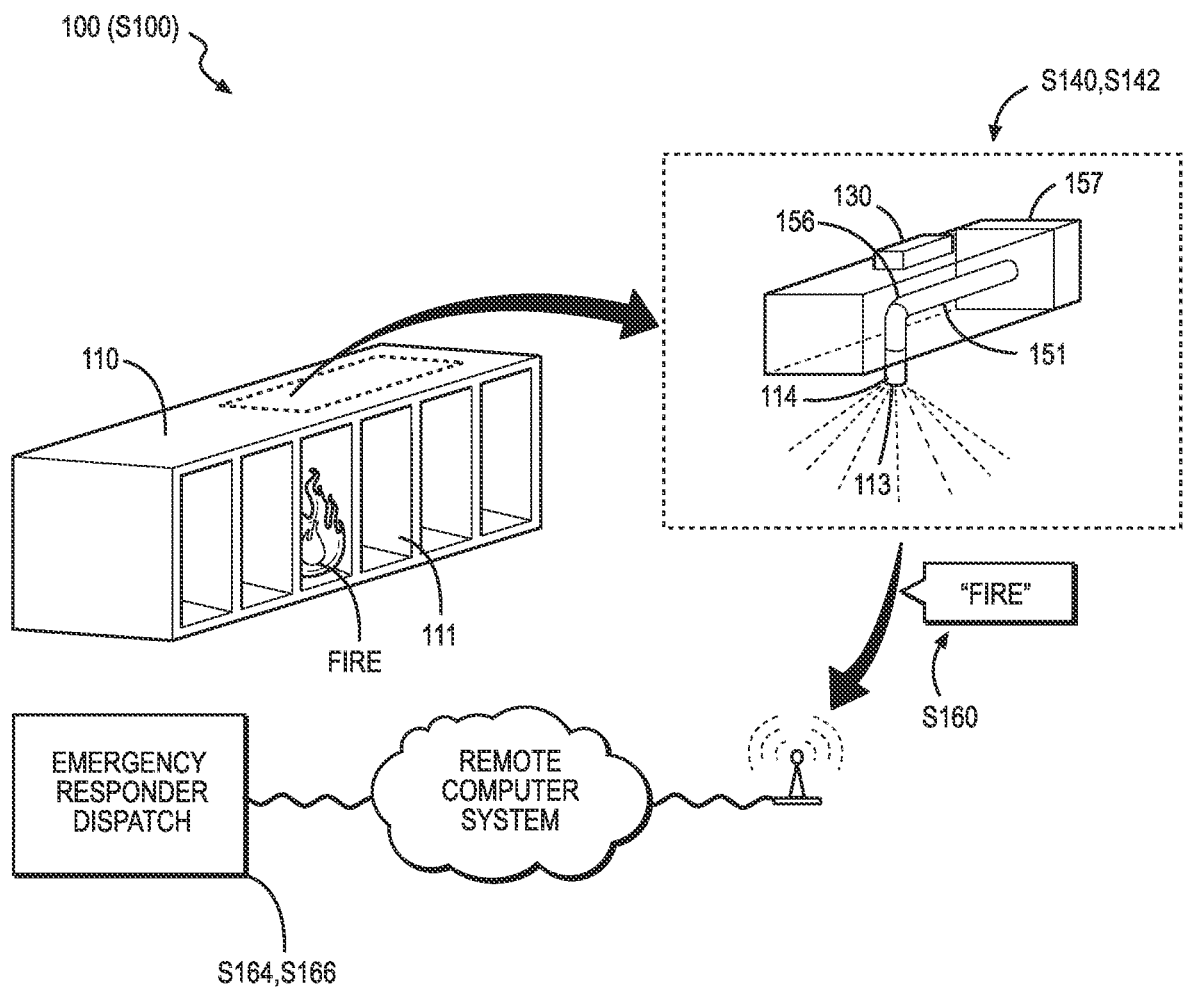
FIG. 1 is a schematic representation of one variation of a system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

As shown in FIGS. 1-8, a system 100 for mitigating a fire within a battery storage container 110 enclosing an energy storage system including a set of battery cells 122. As used herein, a cell or battery cell 122 can include an individual unit of energy storage capacity (e.g., battery, capacitor, etc.), a battery tray 120 can include multiple battery cells 122 arranged serially or in parallel within a battery storage container 110, and a unit can include multiple battery trays 120 assembled together as a complete battery rack 111. The system 100 can include: a fluid storage tank for storing a volume of fluid; the battery storage container 110, a securing mechanism configured to secure the battery storage container 110 enclosing the set of battery cells 122; a cooling channel 151 positioned within the battery storage container 110 and having a lumen disposed between a proximal end, a distal end of the cooling channel 151, the proximal end connected to the fluid storage tank, and a set of apertures 152 contiguous with the cooling channel 151 and configured to eject the volume of fluid from the cooling channel 151, and set of meltable plugs 153 arranged over the set of apertures 152 and configured to melt and expose the aperture 152 in response to an ambient temperature surrounding the system 100 exceeding a threshold temperature, thereby releasing the volume of fluid.

In one variation, the system 100 can include: a battery rack 111; a sensor 113 configured to detect a precursor condition 102 to an incipient fire event in the battery rack 111; and a battery tray 120 configured to retain a set of battery cells 122, occupy the battery rack 111 in an inserted position, and extend out of and be supported by the battery rack 111 in an extended position. The system 100 can further include: a first tray ejector 124 configured to transition the battery tray 120 from the inserted position to the extended position in response to detection of the precursor condition 102. The system 100 can further include an intercooler 150 arranged in the battery tray 120 including a cooling channel 151 configured to circulate fluid to cool the set of battery cells 122 occupying the battery tray 120; a supply manifold 157 arranged proximal the battery rack 111, fluidly coupled to the intercooler 150, and configured to supply fluid to the intercooler 150; and a return manifold 158 arranged proximal the battery rack 111, fluidly coupled to the intercooler 150, and configured to receive fluid from the intercooler 150. The system 100 can further include a nozzle 114: fluidly coupled to the supply manifold 157; arranged in the battery tray 120; and configured to receive fluid from the supply manifold 157 and direct fluid into the battery tray 120 in response to detection of the precursor condition 102.

In another variation, the system 100 can include: a nozzle 114 including an inlet connected to the cooling channel 151 and an outlet positioned to direct a fluid spray pattern within the battery storage container 110 enclosing the set of battery cells 122; and a meltable plug 153 arranged over the outlet of the nozzle 114 and configured to melt and expose the outlet in response to an ambient temperature surrounding the system 100 exceeding a threshold temperature.

In another variation, the system 100 includes a flow detection sensor configured to detect a flow of fluid from the fluid storage tank, into the cooling channel 151, and out of the set of apertures 152 of the cooling channel 151 or the outlet of the nozzle 114; and a controller 130 configured to, in response to the flow detection sensor detecting the flow of fluid through the outlet of the nozzle 114, transmit a warning prompt to a remote monitoring system.

In another variation, the system 100 also includes: a pump 155 connected to the fluid storage tank and configured to draw fluid out of the fluid storage tank, into the cooling channel 151, and out of the outlet of the nozzle 114; and a sensor 113 (e.g., a temperature, humidity, gas/vapor, and/or light sensor 113) configured to detect a change in ambient conditions within the battery storage container 110. In this variation, the system 100 can also include: a directional control valve 156 configured to open and release fluid to flow from the fluid storage tank, through the cooling channel 151, and through the nozzle 114 directing the fluid at the set of battery cells 122 within the battery storage container 110; and a controller 130 configured to, in response to the sensor 113 detecting the change in ambient conditions within the battery storage container 110 exceeding a threshold (e.g., a change in temperature exceeding 100 degrees Celsius), activate the directional control valve 156 to open and activate the pump 155 to draw fluid out of the fluid storage tank, into the cooling channel 151, and out of the outlet of the nozzle 114.

In another variation, the system 100 includes a waste tank 160 (e.g., storage volume) arranged in the bottom of the battery storage container no and configured to collect fluid deposited within the battery storage container 110—responsive to a fire event —to prevent this fluid from escaping the battery storage container 110 and contaminating an environment external to the battery storage container 110.

In another variation, the system 100 includes a door 115 arranged within the perimeter wall of the battery storage container 110 and configured to open in response to the controller 130 detecting flammable and/or explosive gasses within the battery storage container 110 in order to prevent buildup of flammable and/or explosive gasses within the battery storage container no and thus reducing risk of explosion within the battery storage container 110.

In another variation, the system 100 includes a battery tray 120: configured to contain a set of battery cells 122; and configured to automatically eject from (e.g., extend laterally out from) a battery rack in in response to a sensor 113 (or the controller 130) detecting a precursor condition 102 or a fire event within the battery tray 120 in order to reduce risk of the fire event propagating to an adjacent battery tray 120 within the battery storage container no.

1.1 Method

Figure 8:
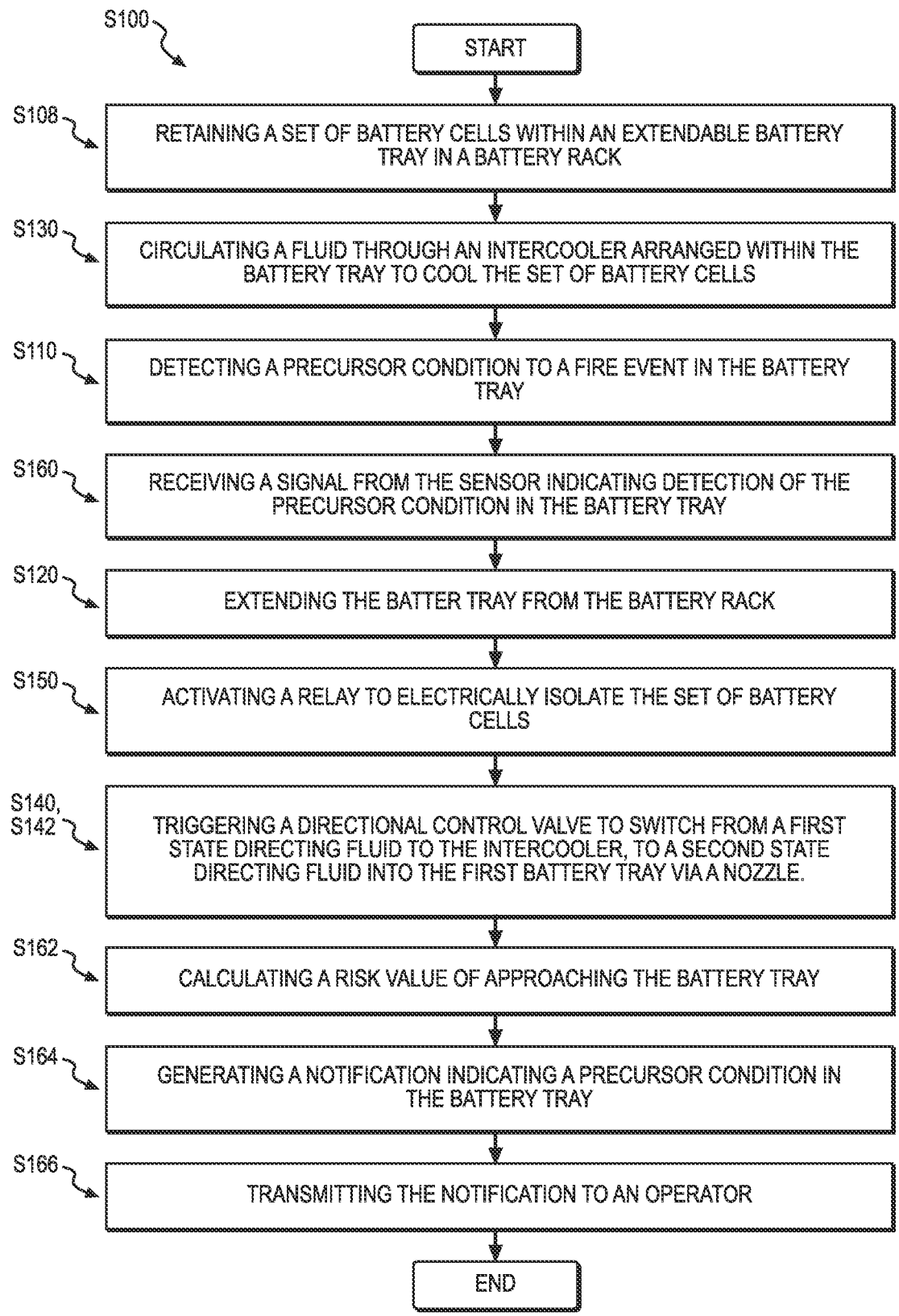
FIG. 8 is a flowchart representation of one variation of the method.

As shown in FIG. 8, the system 100 can execute blocks of a method S100 to detect and mitigate a fire within a battery storage container including: at a battery tray 120 arranged within a battery rack in, retaining a set of battery cells 122 within the battery tray 120 in Block S108; and circulating fluid through an intercooler 150 arranged within the battery tray 120 to cool the set of battery cells 122 occupying the battery tray 120 in Block S130. The method S100 can further include, at a directional control valve 156 fluidly coupled to a supply manifold 157, the intercooler 150, and a nozzle 114 arranged within the battery tray 120: receiving fluid from the supply manifold 157; and supplying fluid to the intercooler 150 in Block S142. The method S100 can further include: at a sensor 113 arranged within the battery tray 120, detecting a precursor condition 102 to an incipient fire event in the first battery tray 120 in Block Silo; in response to detection of the precursor condition 102 by the sensor 113, extending the battery tray 120 from the battery rack 111 in Block S120; and, in response to detection of the precursor condition 102 by the sensor 113, controlling the directional control valve 156 to transition from a first state supplying fluid to the intercooler 150, to a second state supplying the fluid to the nozzle 114 in Block S140. The method S100 can further include, at a controller 130: receiving a signal from the sensor 113 indicating detection of the precursor condition 102 to an incipient fire event in Block S160; in response to receiving the signal from the sensor 113, generating a notification indicating a fire event present in the battery tray 120 in Block S164; and transmitting the notification to an operator in Block S166. In one variation, the method S100 can further include electrically isolating the battery tray 120 exhibiting the precursor condition 102 in Block S150. In another variation, the method S100 can further include, at a controller 130, calculating a risk value of a human approaching the battery tray 120 in Block S162.

2. Applications

Generally, the system 100 is configured to: rapidly respond to an incidence of an ongoing fire event within a battery storage container 110 due to combustion of lithium-ion battery cells stored within the battery storage container 110; suppress the fire event; and mitigate the risks of heat propagation and secondary fire events due to the initial fire event. In particular, the system 100 can direct a fire suppression fluid (e.g., water, inert gas, fire suppression agent, or some combination thereof) to: suppress the ongoing fire event at a particular enflamed lithium battery cell; minimize the propagation of the fire to adjacent lithium battery cells within the battery storage container 110; and minimize the propagation of the fire to adjacent battery trays 120 storing additional lithium battery cells, or to adjacent battery storage containers 110. Furthermore, the system 100 can direct the fire suppression fluid to decrease the ambient temperature within the battery storage container no and minimize the risks of "thermal runaway" (i.e., when elevated temperatures accelerate an energy release by a lithium battery cell that further increases temperatures and can have cascading adverse effects on nearby lithium battery cells), which can otherwise produce an explosive environment within the battery storage container no and increase the probability of a secondary fire and/or explosion.

By decreasing temperatures within adjacent battery trays 120, the system minimizes the risk of thermal runaway propagation outside the battery tray 120 of origin by diminishing the ability of adjacent battery trays 120 to potential combustible gases or other thermal injury. By reducing the overall number of cells involved in a failure event, the overall quantity of combustible gases is also reduced, thereby reducing the overall thermal exposure to the adjacent cells. As described below in more detail, the system: suppresses any potential fires via the fire suppression fluid while simultaneously ventilating the battery trays 120 via ventilation systems so that the fire can be extinguished while the battery tray(s) 120 is being ventilated.

In one implementation, in addition to decreasing temperatures within adjacent battery trays 120, the system is configured to maximize the distance between adjacent battery trays 120 in response to a first battery tray 120 exhibiting a fire event or precursor condition 102 to a fire event. In response to detection of the precursor condition 102, the first battery tray 120 is ejected from the battery rack 111, maximizing the distance between the first battery tray 120 and a second adjacent battery tray 120. Increasing the distance between the first battery tray 120 and the second battery tray 120 reduces the potential for heat transfer between the battery trays 120, thereby interrupting a potential chain reaction of heat propagation through the set of battery cells 122 within the battery storage container 110, potentially causing thermal runaway in a multitude of battery cells 122 and/or destruction of the entire battery storage container 110.

In another implementation, the system 100 is an enclosed apparatus—with a fluid storage tank storing the fire suppression fluid—that can be installed and secured within or external to various types of battery storage containers 110. The system 100 can aerosolize the fire suppression fluid such that the fluid behaves like a gas (i.e., suspended in air) and moves like a gas throughout the battery storage container 110 to: deposit on vertical, horizontal, and angled surfaces and in between the surfaces of the components of the energy storage system; and to interact with the lithium battery cells themselves. Thus, the system 100 can minimize an amount of fire suppression fluid required to suppress a fire and can provide fire suppression to battery storage containers 110 at locations where water and/or other fluid suppression agents are scarce, logistically difficult to coordinate, and/or prohibitively expensive to manage.

The system 100 can be installed in conjunction with additional systems 100 to create a network of systems 100 that can communicate with each other to prevent fire and heat propagation between adjacent battery storage containers no and can supplement fire suppression fluid (e.g., via connecting pipes) to adjacent systems as needed to suppress a fire event at a particular battery storage container 110. For example, a first system 100 of a first battery storage container 110 with an ongoing fire event can transmit a fire event warning prompt to a second system of an adjacent battery storage container 110 to activate a fire suppression response and facilitate cooling within the adjacent battery storage container 110 to decrease the ambient temperature and minimize thermal runaway between battery storage containers no.

In one variation, the system 100 can: actively detect a potential fire event by monitoring outputs of multiple sensors—such as a light sensor, a humidity sensor, gas sensor, and/or a temperature sensor- and detecting changes in such measured ambient conditions; and, in response to detecting these changes, initiate a fire suppression response to cool the ambient environment within the battery storage container no and prevent the potential fire event.

In another implementation, the system 100 can detect a precursor condition 102 to an incipient explosion event, such as unexpected presence of a volatile gas during nominal operation of the system 100, or an increased concentration of a volatile gas known to be present during nominal operation at a lower concentration. In response to detecting the potential for an explosive event in the battery storage container no, the system can trigger a door 115 or vent to open, venting the gas in the battery storage container no to the external atmosphere, and reducing the potential for an explosion. The system can include explosion mitigation systems independent of, or in conjunction with, fire detection and mitigation systems.

Generally, the system 100 is configured to detect a precursor condition 102 indicative of an incipient fire or explosion event particular to lithium-ion battery cells. The system 100 detects the precursor condition 102 at a time prior to development of a fire or explosion to execute a response to mitigate the precursor condition 102 and/or interrupt progression of the precursor condition 102 to a fire or explosion event. However, the system 100 can be configured to detect a precursor condition 102 indicative of an incipient fire event, explosion event, adverse chemical interaction, leak, and/or other event that may preempt a fire or explosive event and initiate an action to mitigate the precursor condition 102 and/or interrupt progression of the precursor condition 102 to a more destructive event.

3. Housing

In one implementation as shown in FIG. 1, the system 100 can include a housing formed of a unitary structure that defines the main body of the system 100. The housing can define: a base; a perimeter wall extending upwardly from the base; a cover disposed over the perimeter wall; a storage chamber bounded by the base, the perimeter wall, and the cover; a first opening for connecting the cooling channel 151 positioned within the storage chamber to the nozzle 114; and a second opening for connecting the cooling channel 151 to the fluid storage tank. Moreover, the housing can include a connector to a set of nozzles 114, a connector to the cooling plate subsystem, a connector to a fluid (e.g., water) storage tank, a connector to a supplemental fluid storage supply, as well as electronic and/or electromechanical connections to a controller 130, a power supply, and/or a reserve power supply. In one example, the housing can include a set of handles for lifting, moving, and/or positioning the system 100 (e.g., during installation of the system 100).

The system 100 can further include a set of securing mechanisms arranged along a top portion of the housing, each securing mechanism configured to transiently or permanently secure the housing to an interior or exterior surface of the battery storage container 110. In one example, the system 100 includes four securing mechanisms arranged at each corner of the base of the housing.

In one variation, the system 100 can include a set of additional securing mechanisms arranged at the centers of the edges of the base of the housing. Accordingly, the system 100 can be secured to a ceiling of the battery storage container 110 such that the system 100 is configured to direct the fluid spray pattern downward onto the set of battery cells 122 enclosed within the battery storage container 110, thereby controlling, suppressing, or extinguishing any fire below and preventing the fire from spreading.

In another variation, the system 100 can include the set of securing mechanisms arranged along a side or bottom portion of the housing such that the system 100 can be secured to a perimeter wall or a bottom surface of the battery storage container 110.

4. Cooling channel

As shown in FIG. 1, the system 100 can further include a cooling channel 151 positioned—or embedded—within the storage chamber of the housing. The cooling channel 151 can define: a proximal end connected to a port on the fluid storage tank; a distal end connected to the nozzle 114; and a lumen disposed between the proximal end and the distal end.

Alternatively, the cooling channel 151 can be embedded within a set of plates, each including: an inlet bringing fluid into the cooling plate from another cooling plate or the fluid supply; an outlet connecting the plate to another plate or returning the fluid to the fluid supply; an enclosed channel or plenum through which the fluid can flow from the inlet to the outlet, containing apertures 152 sealed with a meltable plug designed to fail at a specific temperature resulting in fluid distribution to the adjacent heated surface. Moreover, the cooling plates can have static or circulating fluid and can be monitored for pressure or flow to determine system activation.

In another variation, the cooling plates (and cooling channels 151) can connect independently to the fluid supply in series (e.g., multiple cooling plates connected via a single line to the fluid supply), and/or in parallel (e.g., multiple cooling plates independently connected via multiple lines to the fluid supply).

In another variation, the system 100 can include a set of cooling channels 151 that branch from the proximal end connected to the port of the fluid storage tank, each cooling channel 151 having a corresponding distal end connected to a corresponding nozzle 114. In this variation, a single system 100 can deliver the fluid at multiple directions within the battery storage container 110. Alternatively, the set of cooling channels 151 can individually connect to a corresponding port on the fluid storage tank (rather than branching from the same port).

Figure 6:
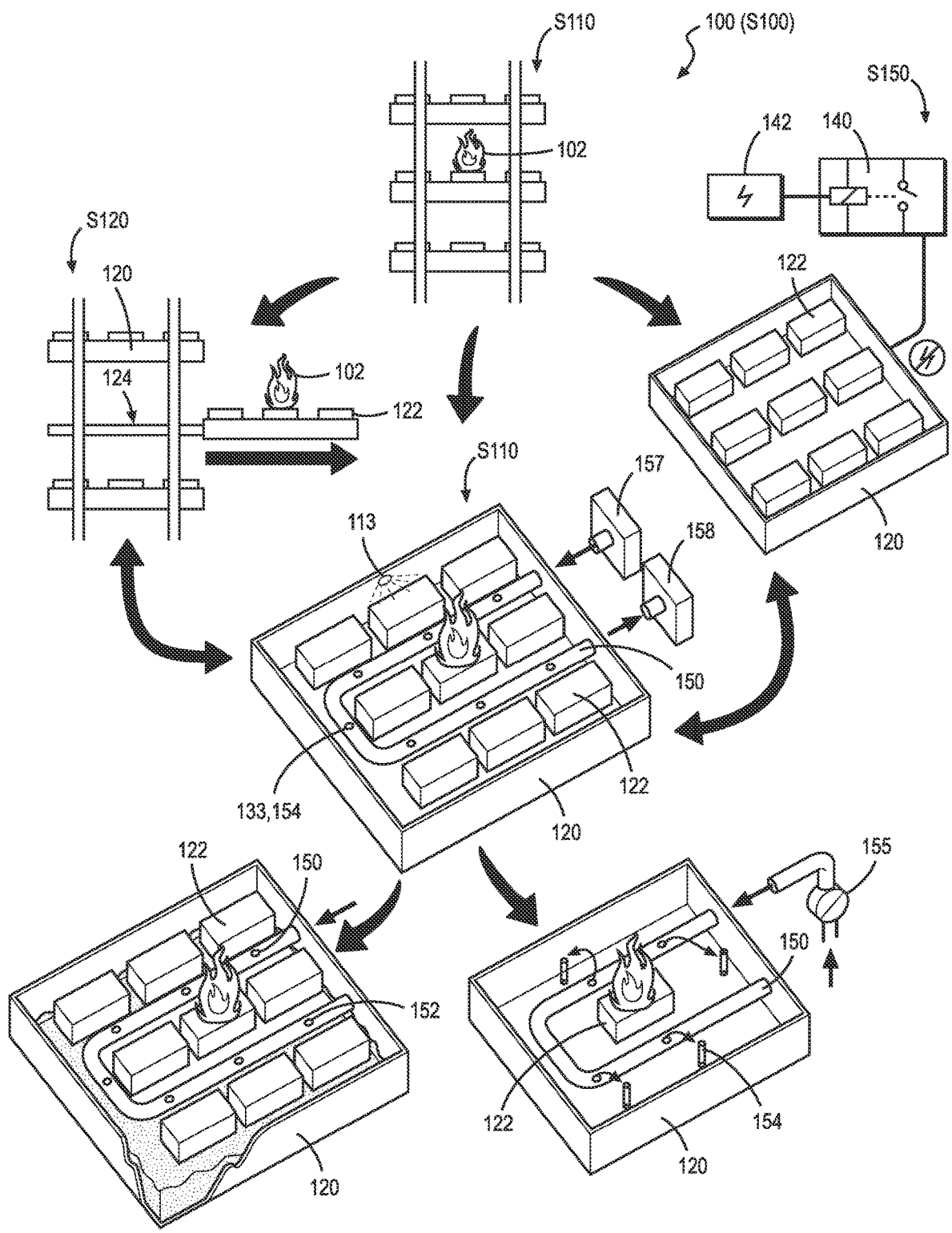
FIG. 6 is a flowchart representation of one variation of the method.

In one implementation, as shown in FIG. 6, the system 100 can include a set of cooling channels 151 arranged within an intercooler 150, the intercooler 150 arranged within a battery tray 120. The intercooler 150 is configured to receive fluid from a fluid supply, such as a supply manifold 157 or fluid storage tank, and circulate the fluid through the battery tray 120 to cool the set of battery cells 122 during nominal operation of the system 100. In one variation in which a set of battery trays 120 is arranged in a set of battery racks 11, each battery tray 120 including an intercooler 150, the system 100 can: be configured to detect a precursor condition 102 to an incipient fire event, such as an increase in temperature, in a first battery tray 120 in the set of battery trays 120; and, in response, increase the flow rate and/or pressure of fluid in the intercoolers 150 of the remaining battery trays 120 (not exhibiting the precursor condition 102) to increase cooling. By increasing cooling of the battery cells 122, the system can reduce or prevent the propagation of heat and/or developing fire conditions from the first battery tray 120 to an adjacent battery tray 120.

5. Nozzle

The system 100 can include a nozzle 114 configured to direct a fluid spray pattern within the battery storage container 110 enclosing the set of battery cells 122. In one implementation, the nozzle 114 includes: a nozzle body; a nozzle lumen spanning between a proximal end and a distal end of the nozzle body; an inlet at the proximal end of the nozzle body and configured to fluidly connect the nozzle lumen to the distal end of the cooling channel 151; an outlet at the distal end of the nozzle body and positioned to direct fluid in the fluid spray pattern at a set of battery cells 122 within the battery storage container 110.

In one variation, a portion of the nozzle body is inset into the first opening of the housing such that the outlet of the nozzle 114 protrudes from the housing. In one example, the system 100 can be secured to a ceiling within the battery storage container 110, and the first opening of the housing can be located on a base of the housing such that the outlet of the nozzle 114 points downward out of the housing and perpendicular to a surface of a battery cell 122. In a variation of this example, the first opening can be located in the perimeter wall of the housing such that the outlet of the nozzle 114 points parallel to a surface of a battery cell 122.

The nozzle 114 can be designed to produce a particular spray pattern, spray angle, volumetric flow rate, and drop size distribution of the fluid exiting the outlet of the nozzle 114. In one implementation, the nozzle 114 can produce a volume median drop size (dv_50) of between 25 and 400 microns. In particular, the nozzle 114 can aerosolize the fluid such that the fluid behaves like a gas (i.e., suspended in air) and moves like a gas throughout the battery storage container 110 in order to deposit the fluid on vertical, horizontal, and angled surfaces, to get drawn in between the surfaces of the battery cells 122, and to interact with the battery cells 122 themselves. The nozzle 114 can be configured to deliver the fluid within the enclosure by generating droplets of an ideal drop size distribution (dv_50) and surface to volume ratio (d_32) via mechanical, pneumatic, or alternative drop formation techniques.

The nozzle 114 body can be configured to include multiple, different geometries, such as: a spiral nozzle, a convergent cone nozzle, and/or a flat fan nozzle. For example, the nozzle 114 can include a fire protection nozzle deflector design or multiple ejection ports to control spray dispersion. The nozzle body can also be configured to include similar variations in order to produce a hollow cone spray pattern, a jet spray pattern, a plume spray pattern, similar variations, or some combination thereof. The nozzle lumen can be configured to include multiple, different geometries such as: a varying cross-sectional area, a uniform cross-sectional area across the length of the nozzle body; and/or a set of vanes configured to cause turbulence within the nozzle lumen and atomize the fluid passing through the nozzle lumen.

In one variation, the system 100 can include a set of nozzles 114—of the same design or of varying design—configured to increase a volumetric flow rate of fluid into the battery storage container no, thereby enabling an accelerated fire suppression response within the battery storage container no.

6. Sensing & Activation

The system 100 can be configured to passively and/or actively respond to changes of the ambient environment (e.g., temperature, gas, humidity, light) within the battery storage container no and either passively or actively initiate a fire suppression response. For example, the system can be activated by detecting gas production, general smoke production, and/or specific gas constituents. Moreover, the system can also include a user interface (e.g., emergency switch or trigger) configured to activate in response to user input.

6.1 Precursor Conditions

As shown in FIGS. 1-2 and 4-7, the system 100 can be configured to identify precursor conditions 102 indicating a potential or incipient fire or explosive event. In particular, the system 100 can be configured to detect a precursor condition 102 indicating an incipient fire event unique to a particular battery cell type, such as a lithium-ion battery cell, based on the characteristics of the battery cell type (such as a particular temperature threshold for a particular cell type.) Generally the system 100 can detect a precursor condition 102 in a particular battery tray 120 and/or be configured to detect the precursor condition 102 in a particular battery cell. The controller 130 can be configured to initiate a particular mitigation action in response to detection of the precursor condition 102, to suppress the precursor condition 102 in the battery tray 120, and thereby mitigate or prevent a fire from developing in the battery tray 120 and/or propagating to an adjacent battery tray 120.

In one variation, the system 100 can be configured to detect a precursor condition 102 to a fire event based on a detected temperature of the battery tray 120 compared to a threshold temperature. The controller 130 can be programmed with a threshold temperature greater than or equal to a nominal operating temperature of the battery cell 122 and less than or equal to an ignition temperature of the battery cell. A sensor 113 arranged within the battery tray 120 can be configured to detect the temperature of the set of battery cells 122 in the battery tray 120 in real time and, in response to the temperature of the battery tray 120 exceeding the threshold temperature, the sensor 113 can transmit a signal to the controller 130. In response to receiving the signal, the controller 130 can initiate a response action to suppress the elevated temperature in the battery tray 120, such as increasing cooling or releasing fluid into the battery tray 120. In one variation, a sensor 113 is arranged in contact with or proximal a particular battery cell 122 and configured to detect the temperature of that battery cell.

In one example in which the sensor 113 is configured to detect a temperature of a battery tray 120 and transmit a signal to a controller 130, the controller 130 can be configured to receive the signal from the sensor 113 and detect the temperature of the battery tray 120 exceeding a threshold temperature based on the signal, indicating a precursor condition 102 for an incipient fire event has been met for the set of battery cells 122 occupying the battery tray 120. In response, the controller 130 triggers a tray ejector 124 to transition the battery tray 120 from an inserted position to an extended position; and triggers a nozzle 114 arranged in the battery tray 120 to direct fluid into the battery tray 120 to suppress the precursor condition 102.

The system 100 can also be configured to detect a precursor condition 102 to a fire event in a battery cell 122 based on a detected pressure of the battery cell. An increase in pressure in the battery cell case of a battery cell 112, such as that caused by swelling in the battery cell case due to outgassing in the battery cell 112, can indicate failure of the battery cell 112 without an increase in temperature. For example, the sensor 113 can be configured to detect a pressure of the battery cell case of a particular battery cell 112, in the set of battery cells, occupying the battery tray 120. The controller 130 is then configured to: receive a signal from the sensor 113 and detect the pressure of the particular battery cell 122 exceeding a threshold pressure based on the first signal, indicating a precursor condition 102 for an incipient fire event has been met in the battery tray 120. In response to detection of the precursor condition 102 in the battery tray 120, the controller 130 triggers the tray ejector 124 to transition the first battery tray 120 from the inserted position to the extended position; and triggers the first nozzle 114 to direct the fluid into the first battery tray 120 to suppress the precursor condition 102.

The controller 130 can be programmed with a threshold pressure greater than or equal to a nominal operating pressure of the battery cell case. The sensor 113 can be arranged within the battery tray 120 or proximal a particular battery cell 122 and can be configured to detect the pressure of the battery cell case. In response to the pressure of the battery cell case of battery cell 122 exceeding the threshold pressure, the sensor 113 transmits a signal to the controller 130. In one variation, the sensor 113 can define: a pressure sensor arranged proximal the battery cell, (e.g., attached to the outer surface of the cell), a piezoelectric sensor interposed between a battery cell 122 and a rigid surface (e.g., a second, adjacent battery cell, a sidewall of the battery tray 120), a belt arranged around the battery cell 122 and configured to detect an increase in belt tension caused by a bulge in the battery cell case, or any other sensor configured to detect material stress, fatigue, and/or deformation in the battery cell case. In response to receiving a signal indicating a pressure increase, the controller 130 initiates a response action to isolate the battery tray 120 from adjacent battery trays 120, such as ejecting the battery tray 120.

Therefore, the system 100 can be configured to detect various precursor conditions 102 preceding a fire event based on the battery cell type. In particular, the system 100 can be configured to detect a temperature increase beyond a temperature threshold and/or a pressure increase beyond a pressure threshold indicating various failure modes of a battery cell, such as thermal runaway or battery cell case deformation or rupture. The system can implement fire mitigation actions to prevent heat propagation through the battery storage container 110 or to arrest or slow thermal runaway of the battery cell.

6.2 Passive Sensing and Activation

In one implementation, the system 100 can include a passive sensing and activation system for: detecting a probable fire within the battery storage container 110; and activating the system 100 in response to detecting the probable fire in order to suppress the fire and/or mitigate the spread of the fire. In particular, the system 100 can include a meltable plug arranged over each of the apertures 152 disposed within the cooling channel 151. The meltable plug 153 can be configured to melt and expose the aperture 152 in response to an ambient temperature surrounding the system 100 exceeding a threshold temperature. More specifically, the meltable plug 153 can be composed of a thermoplastic material that has a melting temperature at or near a minimum temperature of an active fire (e.g., approximately 200 degrees Celsius). Accordingly, in response to the ambient temperature approaching or exceeding 200 degrees Celsius, the meltable plug can melt and expose the aperture, thereby enabling the passage of fire suppression fluid from the fluid storage tank, through the cooling channel 151, thus directing the flow of fire suppression fluid toward the set of battery cells 122 within the battery storage container 110. Accordingly, the system 100 can discharge the fire suppression fluid in a fluid spray pattern toward the set of battery cells 122 in response to a specific change in ambient temperature indicative of an active fire within the battery storage container 110.

For example, as shown in FIG. 6, the cooling channel 151 can: define a set of apertures 152 configured to release fluid from the cooling channel 151 into the first battery tray 120; and include a set of meltable plugs 153, each meltable plug in the set of meltable plugs 153 configured to insert into an aperture in the cooling channel 151, seal the aperture when a temperature of the first battery tray 120 is maintained below a threshold temperature, thereby retaining fluid within the cooling channel 151, and melt in response to the temperature in the first battery tray 120 exceeding a threshold temperature, thereby releasing the fluid into the first battery tray 120.

Therefore, the system 100 can cool the set of battery cells 122 within a battery tray 120 under nominal operating conditions, and direct fluid into the battery tray 120 in response to a precursor condition 102 utilizing the intercooler 150.

In a variation of this example, the meltable plugs 153 are resistant to high pressure and will expose the aperture 152 in the cooling channel 151 when exposed to an elevated temperature, but not when exposed to an elevated pressure in the cooling channel 151. In this variation, the intercoolers 150 including meltable plugs 153 are arranged in each battery tray 120 in a set of battery trays 120. A first battery tray 120 exhibits a precursor condition 102 defining an elevated temperature and, in response, the meltable plugs 153 in the apertures 152 of the intercooler 150 in the first battery tray 120 melt, releasing fluid into the first battery tray 120. The system 100 increases the fluid pressure in the remaining intercoolers 150 to increase cooling within the remaining battery trays 120 not exhibiting elevated temperatures, without ejecting the meltable plugs 153. The increased cooling in the remaining battery trays 120 slows or prevents propagation of heat from the first battery tray 120 exhibiting the elevated temperature to an adjacent battery tray 120. In the event the heat propagation overwhelms the cooling in the adjacent battery tray 120, the meltable plugs 153 melt, exposing the apertures 152 of the cooling channel 151. Fluid is then directed into the adjacent battery tray 120 via the exposed apertures 152 to further increase cooling in the adjacent battery tray 120.

In another implementation, the system 100 can further include a passive electrical disconnect 140 configured to sever an electrical connection between a power bus 142 and the set of battery cells 122 in response to ejection of the battery tray 120. Electrically disconnecting a battery cell 122 exhibiting a precursor condition 102 mitigates thermal runaway in the battery cell 122 by preventing additional current flowing to the battery cell, thereby reducing the rate of temperature increase in the battery cell. Electrically disconnecting the battery cell 122 further reduces or eliminates the possibility of short circuits and/or other injury to additional electrical circuits or other battery cells 122 due to interaction between live electrical circuits and fire suppression fluid, particularly when the battery cell 122, exhibiting the precursor condition 102, is immersed in or exposed to fire suppression fluid, such as when fire suppression fluid is directed into the battery tray 120.

In one example as shown in FIG. 6, the system 100 can include: a power bus 142 arranged proximal the battery rack 111; and an electrical disconnect 140 electrically coupled to and interposed between the power bus, and the set of battery cells 122 within a battery tray 120. The electrical disconnect 140 can be configured to: electrically couple the power bus 142 to the set of battery cells 122 in a coupled state; physically and electrically disconnect the power bus 142 from the set of battery cells 122 in a decoupled state, thereby isolating the battery cell; and transition from the coupled state to the decoupled state in response to ejection of the battery tray 120 from the battery rack 111.

In one variation of this example, the electrical disconnect 140 can define a set of electrical contacts configured to repeatably and non-destructively couple and decouple. The set of electrical contacts can include: a first electrical contact arranged proximal and electrically coupled to the power bus 142 and configured to remain stationary when the electrical disconnect 140 is in both a coupled and decoupled state; and a second electrical contact affixed to the battery tray 120, electrically coupled to the set of battery cells 122 occupying the battery tray 120, and configured to insert into the first electrical contact with an interference fit in the coupled state, thereby completing an electrical connection between the power bus 142 and the set of battery cells 122. When transitioning from the coupled state to the decoupled state, the second electrical contact is configured to release from the first electrical contact as the battery tray 120 is ejected from the battery rack 111, severing the electrical connection. In one variation, the electrical disconnect 140 is reusable. After a fire event occurs, causing the battery tray 120 to be ejected from the battery rack 111, the failed set of battery cells 122 is removed and replaced with a new set of battery cells 122 and electrically coupled to the second electrical contact. As the battery tray 120 is re-inserted into the battery rack 111, the second electrical contact inserts into the first electrical contact, establishing an electrical connection between the power bus 142 and the new set of battery cells 122. In another variation, the set of electrical contacts can couple via methods other than interference fit (e.g., friction fit, magnetic coupling, and/or push-pin contact).

Figure 4:
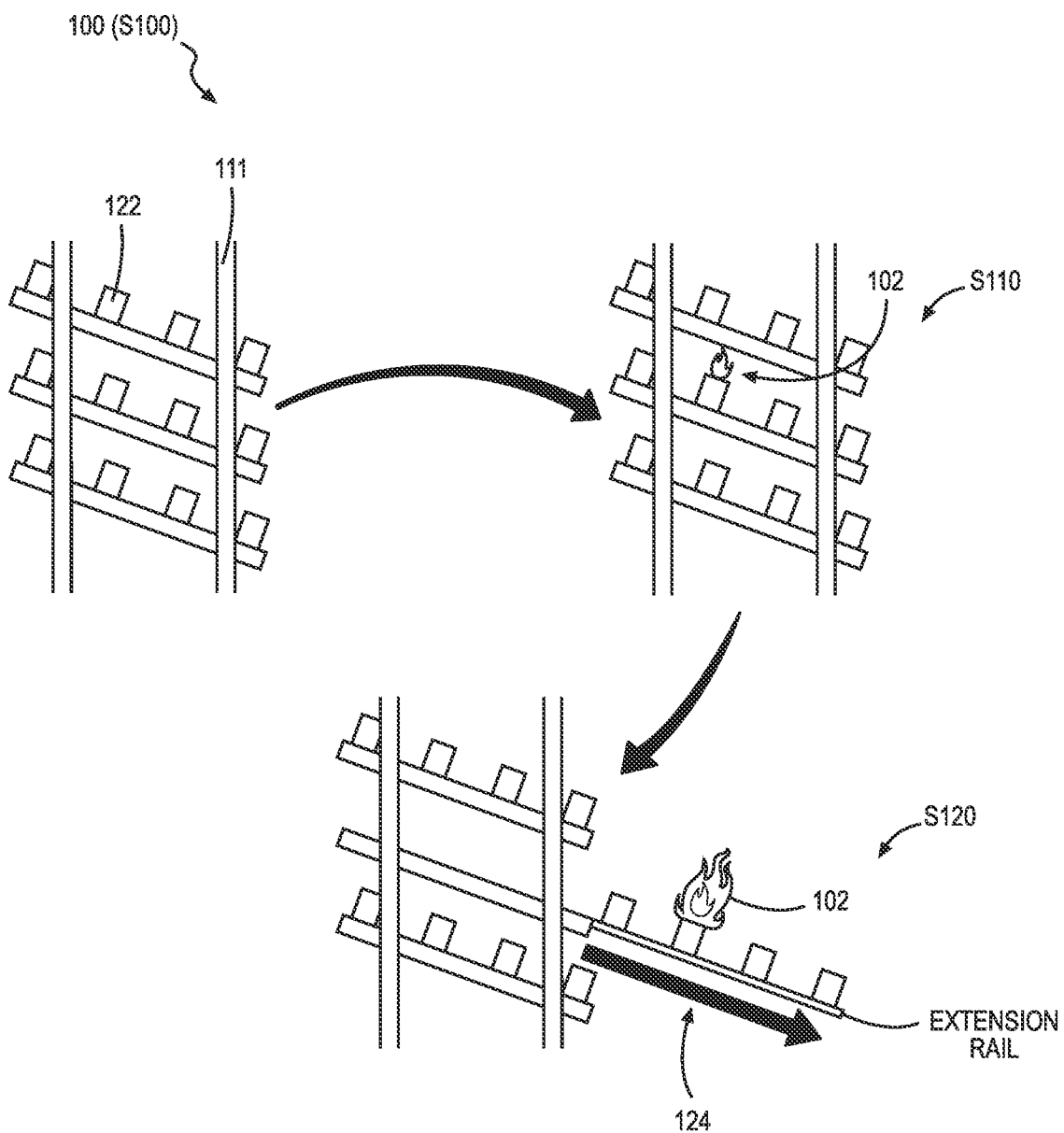
FIG. 4 is a flowchart representation of the method.

In yet another implementation, as shown in FIG. 4, the system 100 can include a passive tray ejector 124 in combination with the intercooler 150 including meltable plugs 153 and the passive electrical disconnect 140 to define a passive system configured to detect a precursor condition 102 and automatically execute a set of mitigation steps to suppress the detected precursor condition 102. The passive tray ejector 124 can include: a spring fixed to the battery rack 111 at a distal end and affixed to the battery tray 120 at a proximal end, configured to compress (i.e., load) when the battery tray 120 is in the inserted position in the battery rack 111, and extend (i.e., unload) when the battery tray 120 is in the extended position external to and supported by the battery rack 111. The passive tray ejector 124 can further include a thermally-sensitive tray latch (e.g., a latch configured to fail in response to an increased temperature, a passive thermocouple electrically coupled to an electromechanical release) configured to retain the battery tray 120 in the inserted position when the ambient temperature proximal the tray latch is below a threshold temperature and release the battery tray 120 in response to the ambient temperature proximal the tray latch exceeding the threshold temperature. In response to the ambient temperature exceeding the threshold temperature, the tray latch releases the battery tray 120 and the spring extends, ejecting the battery tray 120 from the battery rack 111. In another variation, the passive ejector can include the thermally-sensitive tray latch and the battery tray 120 arranged at a downward angle. When the tray latch disengages, the battery tray 120 slides out of the battery rack 111 under the force of gravity. When the passive tray ejector 124 is combined with the intercooler 150 including meltable plugs 153 and the passive electrical disconnect, the system 100 defines a system configured to passively detect an increase in temperature of a battery cell 122 above a threshold temperature, and automatically execute a set of mitigation steps to suppress the elevated temperature in the battery tray 120 including cooling the battery cell, directly exposing the battery cell 122 to fire suppression fluid, severing the electrical connection to the battery cell, and isolating the battery tray 120 from adjacent battery trays 120.

Therefore, the system 100 can passively: detect a precursor condition 102 in a set of battery cells 122 occupying a battery tray 120; and, in response to detection of the precursor condition 102, automatically execute mitigation steps to suppress the precursor condition 102. The system 100 can combine passive systems to: detect a precursor condition 102, cool a battery cell, expose a battery cell 122 directly to fire suppression fluid, sever an electrical connection to the battery cell, and isolate a battery tray 120. Passive systems can be combined to define an automatic detection and mitigation system requiring no power or input; and/or be combined with active systems to provide redundancy to active systems and/or reduce complexity by replacing active systems requiring power or input.

6.3 Active Sensing and Activation

The system 100 can include an active sensing and activation system for: detecting a probable fire within the battery storage container 110; and activating the system 100 in response to detecting the probable fire in order to suppress the fire and/or mitigate the spread of the fire. In particular, the system 100 can include: a sensor 113 (e.g., a temperature, humidity, and/or light sensor 113) configured to detect a change in ambient conditions within the battery storage container 110; and an electro-mechanical valve (e.g., a directional control valve 156, a bi-stable valve) configured to open and release fire suppression fluid to flow from the fluid storage tank, through the cooling channel 151, and through the nozzle 114 directing the flow of fire suppression fluid toward the set of battery cells 122 within the battery storage container 110. In this implementation, the controller 130 can be configured to activate the electro-mechanical valve to open in response to the sensor 113 detecting the change in ambient conditions within the battery storage container 110 exceeding a threshold (e.g., a change in temperature exceeding 100 degrees Celsius). The electro-mechanical valve can be positioned in-line at the proximal end of the cooling channel 151 near the fluid storage tank or at the distal end of the cooling channel 151 near the nozzle 114. When inactive, the electro-mechanical valve can remain in a default closed state to prevent the passage of fluid through the system 100. Accordingly, the system 100 can discharge the fire suppression fluid in a fluid spray pattern directing the flow of fire suppression fluid toward the set of battery cells 122 in response to detecting a fire within the battery storage container 110.

6.3.1 Overhead Sensor

In one implementation, the system 100 can include a sensor 113 arranged within the battery storage container 110 external to the battery racks 111 and battery trays 120. The sensor 113 can define an infrared sensor, thermal imaging sensor, remote temperature sensor, light sensor, or another sensor. The sensor 113 can be configured to detect global ambient conditions within the battery storage container 110, or be configured to detect conditions in a particular battery rack 111 or battery tray 120 within the battery storage container 110.

In one example, the system 100 can include the sensor 113 arranged external to a battery rack 111, such as arranged on a ceiling of the battery storage container 110 and configured to detect a temperature within a battery tray 120 inserted into the battery rack 111. The battery tray 120 includes a tray ejector 124 configured to transition the battery tray 120 from an inserted position to an extended position. The controller 130 is further configured to: receive a signal from the sensor 113; detect the precursor condition 102 in the battery tray 120 based on the signal; and, in response to detecting the precursor condition 102 in the battery tray 120, trigger the tray ejector 124 to transition the battery tray 120 from the inserted position to the extended position. In one variation of this implementation, the sensor 113 is an infrared sensor capable of capturing infrared images.

In one variation, a set of overhead sensors 113 are placed within the battery storage container 110 to provide an overlapping field of view, and/or redundancy to sense precursor conditions 102 within the battery storage container 110. In another variation, a set of overhead sensors can be installed in addition to sensors 113 arranged within battery trays 120 to supplement detection of precursor conditions 102.

Therefore, a single sensor 113 or array of sensors can be arranged within the battery storage container 110 external to the battery trays 120 and battery racks 111, such as in an overhead configuration, to detect precursor conditions 102. The external sensor can be a simple temperature sensor configured to detect ambient conditions within the battery storage container 110, or a thermal imaging sensor configured to detect a precursor condition 102 in an individual battery tray 120. The external sensor can be installed as a retrofit in an existing battery storage container 110, or as a supplement to individual sensors arranged within battery trays 120.

6.3.2 Directional Control Valve

In one implementation as shown in FIG. 1, the system 100 can include a directional control valve 156 fluidly coupled to and interposed between: a supply manifold 157 configured to supply fluid and an intercooler 150; and the supply manifold 157 and a nozzle 114. The directional control valve 156 is configured to: in a first state, receive fluid from the supply manifold 157 and direct fluid to the intercooler 150; and, in a second state, receive fluid from the supply manifold 157 and direct fluid to the nozzle 114. In this implementation, triggering the nozzle 114 to direct fluid into the battery tray 120 is effected by controlling the directional control valve 156 to transition from the first state to the second state, thereby directing fluid from the supply manifold 157 to the nozzle 114.

The directional control valve 156 enables the system 100 to actively change the routing of fluid from the intercooler 150 to the nozzle 114 in response to a detected precursor condition 102. In one implementation, wherein a set of battery cells 122 requires active cooling, the directional control valve 156 can direct fluid to the intercooler 150 to maintain the set of battery cells 122 at a nominal operating temperature at a first time. At a second time, in response to an elevated temperature detected in the tray, the controller 130 can control the directional control valve 156 to transition to the second state directing the fluid into the battery tray 120 via the nozzle 114 to cool the set of battery cells 122. The directional control valve 156 can be controlled independently of or in conjunction with ejection of the battery tray 120. In one variation, the directional control valve 156 can be controlled to switch from directing fluid to the intercooler 150 to directing fluid to the nozzle 114 in response to ejection of the battery tray 120, as opposed to detection of the precursor condition 102.

In one variation in which the first battery tray 120 is configured to extend from the battery rack 111 and receive fluid, the first battery tray 120 further includes a seal, arranged at an end of the first battery tray 120 proximal the battery rack 111 when the first battery tray 120 is in the extended position, and configured to prevent fluid from passing through a gap between the first battery tray 120 in the extended position and the battery rack 111, thereby preventing fluid from escaping the first battery tray 120 and flowing into a second battery tray 120 arranged below the first battery tray 120 in the battery rack 111. The seal prevents fluid passing through the gap to reduce or prevent potential damage to other sets of battery cells 122 in other battery trays 120 arranged within the battery rack 111 caused by interaction with the fluid, and enables the system 100 to maintain electrical connection to other sets of battery cells 122 in other battery trays 120 in the battery rack 111 not exhibiting the precursor condition 102, thereby reducing the risk of short circuit due to electrical interaction between electrical components and the fluid, and preserving a greater amount of energy storage capacity of the system 100.

6.2.4 Secondary Pump and Active Fluid Release

In one implementation as shown in FIG. 6, in which the system 100 includes an intercooler 150 configured to circulate fluid through the battery tray 120, the intercooler 150 further includes: a cooling channel 151 defining a set of perforations configured to release fluid from the cooling channel 151 into the first battery tray 120; and a set of pressure sensitive plugs 154. Each pressure sensitive plug 154 is configured to: insert into a perforation in the cooling channel 151; seal the perforation when a pressure of fluid in the cooling channel 151 is below a threshold pressure, thereby retaining the fluid in the cooling channel 151; and eject from the perforation in response to the pressure of fluid in the cooling channel 151 increasing to greater than the threshold pressure, thereby releasing fluid into the first battery tray 120. In one variation of this implementation, the system can further include a dedicated pump, fluidly coupled to the intercooler 150, and configured to increase the pressure of fluid in the cooling channel 151 above the threshold pressure in response to detection of the precursor condition 102. The controller 130 can be configured to trigger the dedicated pump 155 to activate, thereby increasing the pressure in the cooling channel 151 above the threshold pressure and ejecting the set of pressure sensitive plugs 154 in response to a signal received from a sensor 113.

Therefore, the system 100 can cool the set of battery cells 122 within a battery tray 120 under nominal operating conditions, and direct fluid into the battery tray 120 in response to a precursor condition 102 utilizing the intercooler 150 without a secondary component.

6.3.5 Active Electrical Disconnect

In one implementation, as shown in FIG. 6, the system 100 includes an active electrical disconnect 140 configured to disconnect a set of battery cells 122 exhibiting a precursor condition 102 and/or a fire event from additional electrical circuits in the system 100. The active electrical disconnect 140 can define a relay, transistor, or other electrically operable switch capable of severing an electrical connection in response to receiving a signal from the controller 130. Generally, the active electrical disconnect 140 is a relay configured to electrically isolate the power bus 142 from the set of battery cells 122 exhibiting the precursor condition 102. However, in an implementation in which a faster switching speed is required, the electrical disconnect 140 can be a transistor or other suitable electrically operable switch. Actively disconnecting the battery cell 122 exhibiting a precursor condition 102 can be implemented independent of other mitigation actions (e.g., ejecting the battery tray 120, directing fluid into the battery tray 120) to mitigate thermal runaway in the battery cell 122 by preventing additional current flowing to the battery cell, thereby reducing the rate of temperature increase in the battery cell.

In one example, the system 100 includes the power bus 142 arranged in the battery rack 111 adjacent the battery tray 120, and an electrical disconnect 140 interposed between the power bus 142 and the set of battery cells 122 within the battery tray 120 configured to: electrically couple the power bus 142 to the set of battery cells 122 in a coupled state; electrically disconnect the power bus 142 from the set of battery cells 122 in a decoupled state; and transition from the coupled state to the decoupled state. The controller 130 is configured to trigger the electrical disconnect 140 to transition from the coupled state to the decoupled state in response to detection of the precursor condition 102 in the first battery tray 120. In this example, the electrical disconnect 140 remains physically coupled to the power bus 142 and the set of battery cells 122 in the battery tray 120, but severs the electrical connection, electrically isolating the power bus 142 from the set of battery cells 122. In one variation in which the set of battery cells 122 in the tray is replaced with a new set of battery cells 122, the electrical disconnect 140 can be reset (i.e., recoupled) when the set of battery cells 122 is replaced, as opposed to replacing a destructive electrical disconnect 140 in addition to replacing the set of battery cells 122. Therefore the electrical disconnect 140 can be re-used, reducing the number of components necessary to replace following execution of a mitigation action. In another variation, the electrical disconnect 140 can be controlled by the controller 130 to electrically re-couple the power bus 142 to the set of battery cells 122 in the event the controller 130 detects a false-positive precursor condition 102. Therefore the controller 130 can automatically restore electrical storage capacity of the system in the event a false-positive precursor condition 102 is detected, and the false-positive characteristic is verified by the controller 130, such as by comparing the false-positive signal to signals from other sensors 113 indicating nominal conditions.

In another example, the controller 130 can be configured to, at a first time, detect a precursor condition 102 in a battery tray 120 based on a first signal received from a sensor 113 arranged in the battery tray 120, the first signal indicating an increase in temperature within the battery tray 120 exceeding a first threshold temperature. In response to detecting the precursor condition 102, the controller 130 can trigger the electrical disconnect 140 to sever the electrical connection between the power bus 142 and the set of battery cells 122. The controller 130 can then, at a second time following the first time, receive a second signal from the sensor 113 indicating the temperature within the battery tray 120 falling below a second threshold temperature and based on the second signal, detect that the precursor condition 102 is suppressed within the first battery tray 120. Alternatively, at the second time, the controller 130 can receive a third signal from the sensor 113 indicating the temperature in the battery tray 120 exceeding a third threshold temperature greater than the first threshold temperature and, in response, detect that thermal runaway is occurring in the battery cell 122 and/or a fire is imminent in the battery tray 120. In response, the controller 130 can initiate additional mitigation actions such as: triggering the battery tray 120 to eject from the battery rack 111; controlling the directional control valve 156 to switch states to direct fluid to the nozzle 114; and/or triggering the overhead fire suppression system to direct fluid into the battery tray 120.

7. Fluid Storage Tank

In one implementation, the system 100 can include a fluid storage tank that stores a volume of fluid configured to suppress a fire and/or mitigate a spread of the fire when the fluid is sprayed within the battery storage container 110. As used herein, the term fluid can include liquids or gases that can be stored and dispersed in liquid or gaseous/vapor form. The fluid can include water, a clean agent (e.g., an inert gas, a combination of inert gases), aerosol, a water-based solution including a water additive, or some combination thereof that can be dispersed in a vapor or gaseous form throughout the battery storage container 110.

Generally, the system 100 can include a valve for connecting directly to a water supply source provided by a fire department. In this variation, the fire department can provide an additional source of water (e.g., via a fire truck dispatched to a location of the battery storage container 110 in response to a fire alert and/or a nearby fire hydrant), and the system 100 can direct the water within the battery storage container 110, thus providing direct access to the source of the fire. Moreover, the system 100 can connect directly to local or private water mains or complementary sources associated with the building in which the battery storage container no is located.

In a variation, the system 100 can draw fluid from a set of fluid storage tanks between adjacent containers by, for example, connecting a set of tubes from the fluid storage tanks of a second system 100 on a second battery storage container no and a third system 100 on a third battery storage container no to the fluid storage tank of the first system 100. Accordingly, the system 100 can draw additional fluid as needed from fluid storage tanks attached to containers without a current fire and redirect the fluid toward the battery storage container 110 with a current fire.

8. Power & Pump

The system 100 can further include a pump 155 connected to the fluid storage tank and configured to draw fluid out of the fluid storage tank, into the cooling channel 151, and out of the outlet of the nozzle 114. More specifically, system 100 can include a fluid pump 155 (e.g., a water pump) and a separate fan to create a partial vacuum and draw fluid out of the fluid storage tank. Generally, the pump 155 can supply the nozzle 114(s) with fluid from the fluid storage tank and the cooling channel 151 with fluid from the fluid storage tank in response to system activation. Moreover, the pump 155 can also circulate the fluid through the cooling channel 151 to disperse heat (e.g., active fluid cooling) from adjacent cells.

In one variation, the system 100 can draw fluid out of the fluid storage tank by relying on pressure differentials between the fluid storage tank and the ambient atmosphere. For example, the fluid storage tank can be pressurized, such that, when the nozzle 114 outlet is opened—via a valve release or a melted plug—the fluid can be drawn toward the lower pressure environment within the battery storage container 110 and automatically disperse fluid in vapor or gaseous form from the fluid storage tank and out of the nozzle 114 outlet.

In addition, the system 100 can include a power source configured to provide power to the pump 155 and/or the controller 130. Alternatively, the system 100 can include an electrical connection configured to connect the system 100 to the set of battery cells 122 within the battery storage container 110 in which the system 100 is installed.

8.1 Integration with Overhead Fire Suppression System

Figure 5:
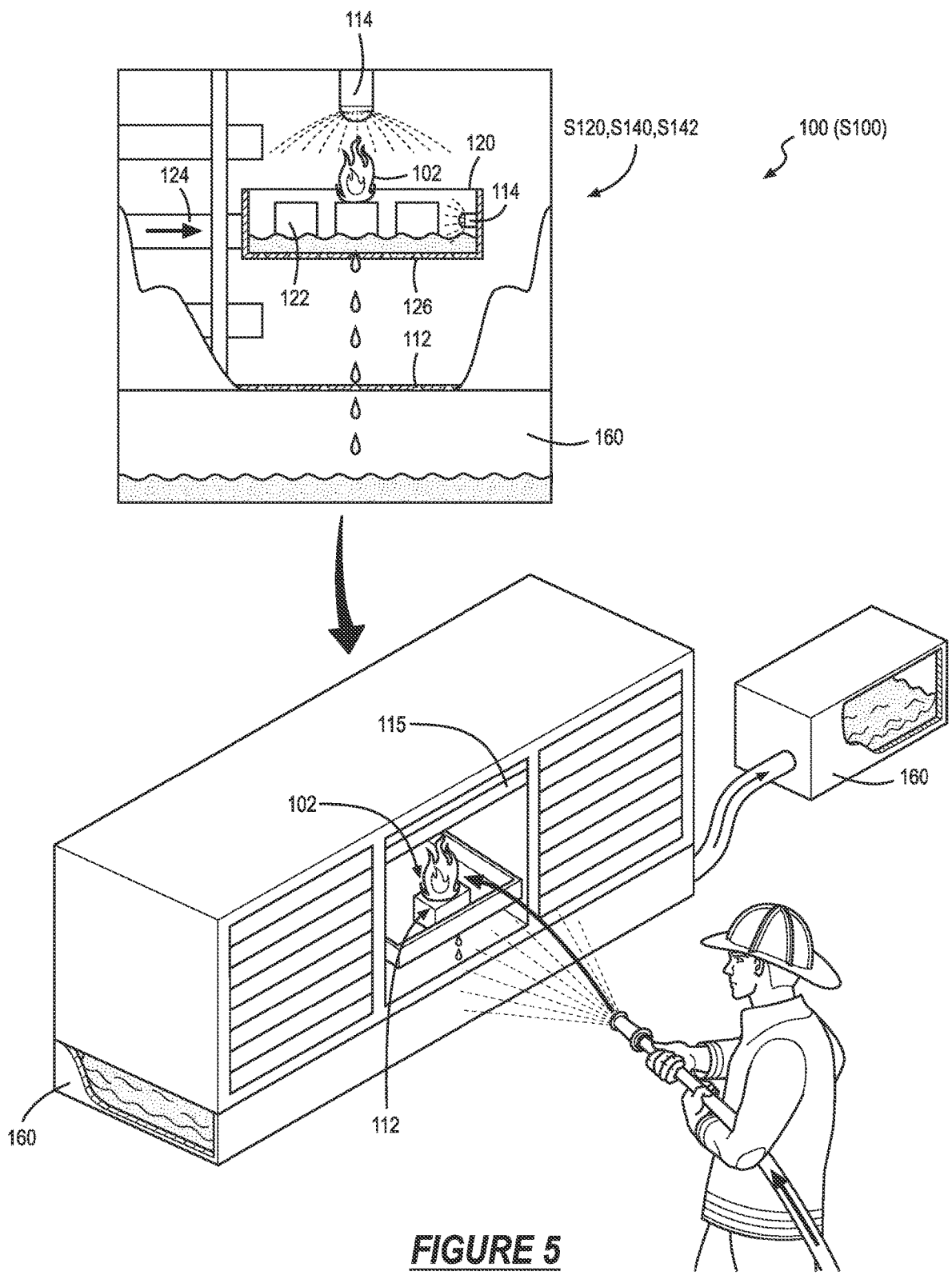
FIG. 5 is a flowchart representation of one variation of the method.

In another implementation, as shown in FIG. 5, the system 100 can be integrated into a battery storage container 110 equipped with an overhead fire suppression system. The battery rack 11 can be arranged to eject a battery tray 120 from the battery rack in and into a position beneath a fire suppression nozzle 114 arranged overhead.

For example, as shown in FIG. 5, the system 100 can include a nozzle 114 arranged above and laterally offset from the battery rack in and configured to direct fluid into the first battery tray 120 when the battery tray 120 is in the ejected position. At a first time, a sensor 113 is configured to detect a precursor to an incipient fire condition. At a second time following the first time, the first battery tray 120 is configured to eject from the first battery rack 111. At a third time following the second time, the second nozzle 114 is configured to direct fluid into the battery tray 120.

The controller 130 executes the preceding sequence of mitigation actions to utilize the existing fire suppression system in the battery storage container 110 to suppress a precursor condition 102 in a battery tray 120. The controller 130 can also limit damage to the remainder of the system 100 by positioning only the battery tray 120 exhibiting the precursor condition 102 beneath a nozzle 114, thereby only exposing that battery tray 120 to a fire suppression fluid.

In another implementation in which the controller 130 detects a rapid propagation of a precursor condition 102 between battery trays 120, the controller 130 can trigger alternating battery trays 120 to eject from the battery racks 111 to maximize the distance between adjacent battery cells 122, and trigger the existing fire suppression system to activate, thereby suppressing the propagation of the precursor condition 102 through the battery storage container 110. Additionally, the controller 130 can cut power to the battery storage container 110. Alternatively the controller 130 can trigger the electrical disconnect 140 of each battery tray 120 to sever the electrical connection between the power bus 142 and the set of battery cells 122 in the battery tray 120.

In one variation in which the fire suppression system utilizes an inert gas as a fire suppression fluid, the inert gas can supplement the ejection and electrical isolation of the battery trays 120 to suppress and arrest the propagation of precursor condition 102 in the battery trays 120. By executing non-destructive mitigation actions (e.g., ejecting battery trays 120, electrically isolating battery trays 120, releasing an inert gas fire suppression fluid) independently or in combination to suppress the precursor condition 102 or a fire event, the system 100 can execute mitigation actions that affect all battery cells within the container, without causing collateral damage to the remaining battery trays 120 not exhibiting the precursor condition 102. Therefore, the system 100 can execute non-destructive mitigation techniques that target and suppress a precursor condition 102 or fire event within the battery storage container 110, while preventing collateral damage due to mitigation actions in system components not directly damaged by battery cell failure or a fire event.

Therefore, the system 100 can be integrated into a battery storage container 110 equipped with an existing fire suppression system. The controller 130 can be configured to activate individual nozzles 114 or extend individual battery trays 120 into position to receive fluid from overhead nozzles 114. The system 100 can utilize non-destructive mitigation actions to reduce or eliminate the number of components damaged as a consequence of the mitigation action, rather than the fire event, and reduce the number of components necessary to replace following a fire suppression event to only the components directly damaged by battery cell 122 failure or the fire event itself.

9. Controller

As noted above, in one variation, the system 100 can include a controller 130 configured to: monitor ambient conditions within the battery storage container 110 based on sensor 113 data; activate a fire suppression response in response to a possible fire event; release latching mechanisms; and generate and transmit a set of warning prompts associated with the fire event to a remote monitoring system and/or a fire department.

9.1 Sensor Integration and Signal Interpretation

Generally as shown in FIG. 1, the controller 130 is configured to: receive a signal from a sensor 113 arranged in the battery storage container no and interpret the signal to detect a precursor condition 102. The controller 130 is configured to initiate actions to mitigate or suppress the precursor condition 102 in a particular battery tray 120, set of battery trays 120, or in the battery storage container no as a whole in response to the signal (or signals) received.

In one example, the system 100 includes: a first sensor 113, arranged in the battery rack 111 adjacent a first battery tray 120, configured to detect a first precursor condition 102 to an incipient fire condition in the first battery tray 120; and a second sensor 113, arranged in the battery rack 111 adjacent a second battery tray 120, configured to detect a second precursor condition 102 in the second battery tray 120. The controller 130 is configured: to receive a first signal from the first sensor 113 and a second signal from the second sensor 113; and to detect the precursor condition 102 in the first battery tray 120 based on the first signal. In response to detecting the precursor condition 102 in the first battery tray 120, the controller 130 is configured to trigger the first tray ejector 124 to transition the first battery tray 120 from the inserted position to the extended position and trigger the first nozzle 114 to direct the fluid into the first battery tray 120 to suppress the precursor condition 102 in the first battery tray 120.

In one variation, the controller 130 can receive the second signal from the second sensor 113 and detect nominal operating conditions in the second battery tray 120 based on the second signal but, in response to detecting the precursor event in the first battery tray 120, increase cooling in the second battery tray 120 to prevent the precursor condition 102 propagating to the second battery tray 120.

Therefore, the system 100 can define an active system including a controller 130 configured to receive and interpret a set of signals from a set of sensors 113 arranged within the battery storage container 110, interpret the set of signals to detect presence or propagation of a precursor condition 102 in a particular location in the battery storage container 110, and initiate a targeted response action based on the precursor condition 102. The controller 130 can be configured to trigger additional system components to effect increasingly potent mitigation actions in the battery storage container 110.

9.2 Monitoring and Activation

In another variation, the controller 130 can be configured to activate the valve to open and activate the pump 155 in response to the sensor 113 detecting the change in ambient conditions within the battery storage container 110 exceeding a threshold (e.g., a change in temperature exceeding 100 degrees Celsius).

Thus, the controller 130 can: detect an increase in ambient temperature indicative of a potential fire event; and activate the fire suppression response in response to the detected increase in ambient temperature to prevent a possible fire event within the battery storage container 110. Moreover, the controller 130 can: detect an increase in ambient temperature indicative of an ongoing fire event; and activate the fire suppression response in response to the detected increase in ambient temperature to suppress the ongoing fire event within the battery storage container 110 and mitigate heat propagation to adjacent battery storage battery trays 120, units, or containers.

In one variation, the controller 130 can be integrated into the system 100 thereby forming a closed-loop control circuit within the system 100. In another variation, the controller 130 can be remotely networked into a system 100 or a set of systems 100 such that the controller 130 can: receive multiple inputs from multiple sensor 113s within the set of systems 100; and control an optimized response to a potential fire by each of a set of systems 100 in response to a sensor 113 detecting a potential fire event. For example, a remotely networked controller 130 can control a response to a sensor 113 detecting a potential fire event in a first system 100 of the set of systems 100 by routing fluid resources to a container in which a potential fire event is sensed from a container(s) in which a fire event is not sensed. Additionally or alternatively, the remotely networked controller 130 can be configured as a subsystem within a larger emergency management architecture.

9.2 Isolation of Battery Tray with a Detected Precursor Condition

In one variation in which battery trays 120 are arranged in the battery rack 11 in a vertical stack configuration, a battery tray 120 is configured to automatically eject from the battery rack 111 when a precursor condition 102 or fire event is detected in the battery tray 120. The battery tray 120 is mounted on a set of slides, such as full-extension drawer slides, and is free to move horizontally beyond the edge of the battery rack 11 such that the entire volume of the battery tray 120 extends beyond the edge of the battery rack 11 while remaining physically attached. An actuator (e.g., a spring mechanism, a piston) is mounted to the set of slides and is under tension when the battery tray 120 is within the energy storage rack. The actuator extends to force the battery tray 120 to extend from the battery rack 11. An electronically controllable, releasable latching mechanism such as an electromagnetic latch or an electrical fusible link is mounted between the battery tray 120 and the structure of the battery rack 11 and holds the battery tray 120 in place within the battery rack 11 against the expulsive force of the actuator. The controller 130 can be configured to activate the latching mechanism to release the battery tray 120 in response to a sensor 113 detecting a change in ambient conditions within the battery tray 120 exceeding a threshold (e.g., temperature, gas, humidity, light.)

Upon sensing a change in the ambient conditions indicative of a precursor condition 102 or a fire event in the battery tray 120, the controller 130 activates the latching mechanism to release, and the actuator forces the battery tray 120 to extend horizontally out of the battery rack 111 along the set of slides. Once the battery tray 120 is extended from the battery rack 111, the battery tray 120 is isolated from the remaining battery trays 120 and the likelihood of a fire event occurring within the battery tray 120 propagating to adjacent battery trays 120 is reduced. Further, when firefighters respond to the fire event, the battery tray 120 is now exposed beyond the battery rack 111, allowing the firefighters more freedom to respond to the fire event than if the battery tray 120 were still located within the battery rack 11.

For example, the controller 130 can detect a temperature increase at a first battery tray 120 beyond a threshold (i.e., 100 degrees Celsius) via a temperature sensor 113 mounted to the first battery tray 120. The controller 130 can then activate the latching mechanism to release the first battery tray 120, causing the actuator to extend and force the first battery tray 120 out of the battery rack 11. The controller 130 can continue to monitor the temperature and other ambient characteristics of the first battery tray 120 and any other battery trays 120 proximal the first battery tray 120. The controller 130 can transmit a warning prompt to a remote monitoring system to alert the operator of a potential and/or active fire event within the battery tray 120, and that the battery tray 120 is extended beyond the battery rack 11. The controller 130 can also transmit a warning prompt and real-time ambient conditions of the battery tray 120 and battery storage container 110 to firefighters. Once the firefighters arrive, the battery tray 120 is exposed beyond the battery rack 111, and the firefighters can attack the fire event from multiple angles.

Thus, the controller 130 can: detect a change in the ambient conditions within or proximal the battery tray 120 indicative of a potential fire event; and activate the latching mechanism to release the battery tray 120 from the battery rack 111 in response to the detected ambient conditions in order to isolate the battery tray 120 and prevent a possible fire event within the battery rack 111. Moreover, the controller 130 can: detect a change in the ambient conditions within or proximal the battery tray 120 indicative of an ongoing fire event; and activate the latching mechanism to release the battery tray 120 from the battery rack 111 in response to the detected ambient conditions to isolate the battery tray 120 to mitigate heat propagation to adjacent battery storage battery trays 120, units, or containers. The controller 130 can then alert an operator or emergency responders to the potential and/or active fire event and transmit the current or last recorded conditions of the battery tray 120 and battery storage container 110.

In another variation, the system 100 can actively detect a potential fire event within a battery tray 120 by monitoring outputs of multiple sensors including a light sensor, humidity sensor, gas sensor, and a temperature sensor. The controller 130 can activate the latching mechanism to release in response to a sensor 113 detecting a change in ambient conditions within or proximal the battery tray 120 that precede a fire event, such as detecting an increase in the volume of a gas (i.e., hydrogen) beyond a threshold proximal the battery tray 120.

In another variation as shown in FIG. 4, the battery tray 120 is mounted within the battery rack 11 on a set of slides sloping downward. When the controller 130 activates the latching mechanism to release, the battery tray 120 slides out of the battery rack in under the pull of gravity.

In another variation, the battery tray 120 is mounted on a set of rails such that when the battery tray 120 is forced out of the battery rack 111, the battery tray 120 separates from the battery rack in and falls to the ground.

9.4 Arresting Fire Propagation

Generally, as shown in FIG. 6, the system 100 is configured to implement mitigation actions to interrupt, slow, or prevent propagation of a precursor condition 102 (such as increased temperature) or a fire event from a first set of battery cells 122 to a second set of battery cells 122. The system 100 can implement mitigation actions to suppress a precursor condition 102 detected in a first battery tray 120, such as: severing the electrical connection to the set of battery cells 122; and/or cooling the set of battery cells 122 directly via a nozzle 114 or indirectly via an intercooler 150 as noted above. The system 100 can execute mitigation actions in a sequence to arrest the propagation in a minimum time duration, such as first implementing a most potent mitigation action (e.g., flooding the battery tray 120 with fluid), and subsequently implementing a less potent mitigation action that causes less damage to the components of the system 100 (e.g., electrically isolating the set of battery cells 122.) In one example, in response to receiving a first signal from a sensor 113 in a battery tray 120, the controller 130 initiates a first mitigation action to electrically isolate the set of battery cells 122 (i.e., via the electrical disconnect) to suppress the precursor condition 102 in a particular battery cell in the set of battery cells 122. The controller 130 is configured to execute electrical isolation as a first mitigation action to preserve the remaining battery cells 122 in the set of battery cells 122. The controller 130 then receives a second signal from the sensor 113 and detects that the precursor condition 102 is still present in the battery tray 120 and, in response, triggers the first tray ejector 124 to eject the first battery tray 120 from the battery rack 111. The system 100 ejects the first battery tray 120 to increase the distance between the battery trays 120 to prevent or reduce the likelihood of heat transferring between battery trays 120, thereby interrupting propagation of heat between adjacent battery trays 120 and reducing or preventing the chance of a thermal runaway chain reaction in the battery storage container 110. In one variation of this example wherein the first battery tray 120 continues to exhibit the precursor condition 102 after ejection, the controller 130 can additionally trigger a nozzle 114 to direct fluid into the battery tray 120 to suppress the precursor condition 102.

Therefore the system 100 can implement mitigation actions in an increasingly potent but increasingly destructive sequence to preserve the greatest number of system components while successfully suppressing a precursor condition 102 or fire event before the entire contents of the battery storage container 110 are destroyed.

In one implementation, the system 100 can be configured to eject adjacent battery trays 120 in an alternating fashion to maximize the distance between adjacent battery trays 120 to mitigate the propagation of a precursor condition 102 or developing fire event. For example, the system 100 can include: a first battery tray 120 arranged in a battery rack 11 and configured to eject from the battery rack 11; a second battery tray 120 arranged above the first battery tray 120 in the battery rack 11; and a first sensor 113 arranged in the first battery tray 120 configured to detect the precursor condition 102 in the first battery tray 120. In response to detection of the first precursor condition 102, the first battery tray 120 ejects from the battery rack 11 to increase the distance between the first battery tray 120 and the second battery tray 120, thereby reducing potential heat transfer between the first battery tray 120 and the second battery tray 120 and arresting or slowing propagation of the first precursor condition 102. In a variation of this example in which the first battery tray 120 is fixed to the battery rack 11, the second battery tray 120, arranged above the first battery tray 120, is configured to eject from the battery rack 111 in response to detection of the first precursor condition 102 in the first battery tray 120. In another example, the preceding steps can be implemented for a first battery tray 120 and a second battery tray 120, which are arranged laterally adjacent. Additionally, the preceding steps can be implemented for an array of battery trays 120 arranged vertically and laterally in a battery rack 111 or set of battery racks 111, to eject alternating battery trays 120 to maximize the distance between any two adjacent battery trays 120 to arrest propagation of a precursor condition 102 or developing fire event.

In one variation of this implementation, the controller 130 can selectively eject an individual battery tray 120 or a sequence of battery trays 120 to mitigate propagation of the precursor condition 102. For example, the system 100 can include: a first battery tray 120 configured to eject from a battery rack 11 via a first tray ejector; a first nozzle 114 arranged within the first battery tray 120 configured to direct fluid into the first battery tray 120; and a first sensor 113 configured to detect a precursor condition 102 in the first battery tray 120 at a first time. The system 100 can further include a similar second battery tray 120, second nozzle 114, and a second sensor 113 configured to detect a second precursor condition 102 at a second time. The system 100 can further include a similar third battery tray 120, third nozzle 114, and a third sensor 113 configured to detect a third precursor condition 102 at a third time.

In this example, the controller 130 is configured to receive a first signal from the first sensor 113 at the first time and detect the first precursor condition 102 in the first battery tray 120 based on the first signal. In response to detecting the precursor condition 102 in the first battery tray 120, the controller 130: triggers the first tray ejector 124 to transition the first battery tray 120 from the inserted position to the extended position; and triggers the first nozzle 114 to direct the fluid into the first battery tray 120 to suppress the precursor condition 102 in the first battery tray 120. The controller 130 then receives a second signal from the second sensor 113 at the second time and detects the second precursor condition 102 in the second battery tray 120 based on the second signal. In response to detecting the second precursor condition 102 in the second battery tray 120, the controller 130: triggers the third tray ejector 124 to transition the third battery tray 120 from the inserted position to the extended position; and triggers the second nozzle 114 to direct fluid into the second battery tray 120 to suppress the second precursor condition 102 in the second battery tray 120.

Therefore, the controller 130 can receive a first signal indicating a first precursor condition 102 in a first battery tray 120 at a first time, receive a second signal indicating a second precursor condition 102 in a second tray adjacent to the first tray at a second time, and detect propagation of a fire event within the battery storage container 110 based on the two signals and the relative locations of the first battery tray 120 and the second battery tray 120. Further, the controller 130 can interpret the first and second signals to predict propagation of the precursor condition 102 to the third battery tray 120, and preemptively trigger the third battery tray 120 to eject from the battery rack 11, thereby interrupting propagation of heat to the third battery tray 120 before it can exhibit a precursor condition 102.

9.5 Warning Prompts

In one variation, as shown in FIGS. 1 and 8, the controller 130 can be configured to transmit a warning prompt to a remote monitoring system to alert an operator of a potential and/or active fire event within a battery storage container 110.

In this variation, the system 100 can further include a sensor 113 (e.g., a temperature, humidity, gas, and/or light sensor 113) configured to detect a change in ambient conditions within the battery storage container 110, wherein the controller 130 can be configured to transmit the warning prompt to the remote monitoring system in response to a sensor 113 detecting the change in ambient conditions.

Additionally or alternatively, the system 100 can further include a flow detection sensor 113 configured to detect a flow of fluid through the cooling channel 151/plate and/or the nozzle 114, wherein the controller 130 is configured to transmit the warning prompt to the remote monitoring system in response to the flow detection sensor 113 detecting the flow of fluid through the nozzle 114. For example, if the sensor 113 detects the flow of fluid through the nozzle 114 in a passive response configuration of the system, then the controller 130 can: identify that the plug has melted and therefore there is a significant change in temperature in the vicinity of the nozzle 114; and, in response, transmit the warning prompt to the remote monitoring system indicating a potential fire event.

Moreover, the controller 130 can be configured to: automatically alert and/or dispatch a fire department to a location of the battery storage container 110; and/or activate a set of systems 100 on or in adjacent battery storage containers 110 (i.e., to prevent spread of an active fire event). Alternatively, the controller 130 can be configured to: transmit the warning prompt; transmit information associated with the fire event (e.g., a location of the battery storage container 110, sensor 113 data); and display these options described above on a user interface of the remote monitoring system, thereby enabling the operator to select a set of actions based on the fire event information.

For example, the system 100 can include the sensor 113 configured to: at a first time preceding ejection of the battery tray 120 from the battery rack 111, detect a first temperature within the battery tray 120 below a threshold temperature; at a second time following the first time, detect a second temperature within the battery tray 120 exceeding the threshold temperature; and, at a third time following the second time and following ejection of the battery tray 120 from the battery rack 11, detect a third temperature within the battery tray 120 falling below the threshold temperature. The controller 130 is configured to receive a first signal from the sensor 113 indicating the second temperature detected in the battery tray 120 at a fourth time following the second time and preceding the third time. In response, the controller 130 detects the precursor condition 102 in the battery tray 120 based on the first signal. The controller 130 receives a second signal from the sensor 113 at a fifth time following the third time, and in response, calculates a present risk value of approaching the battery tray 120 based on the second signal, the composition of the set of battery cells 122 in the battery tray 120, and a difference between the fifth time and the present time. The controller 130 can then detect the present risk value falling below a threshold risk value. Generally the present risk value is inversely proportional to the difference between the fifth time and the present time, and as such, the present risk decreases as time progresses. In response to detecting the present risk value falling below the threshold risk value, the controller 130 is configured to: generate a prompt to approach the battery tray 120 and replace the first set of battery cells 122 in the first battery tray 120, the prompt including the present risk value; and transmit the notification to an operator.

Therefore, the controller 130 can be configured to: receive a set of signals from a sensor 113 arranged in the battery storage container 110; interpret the set of signals to detect and/or characterize the conditions of a battery tray 120; calculate a risk value of a human approaching the battery tray 120 based on the conditions in the battery tray 120, the composition of the battery tray 120 contents, and a time duration. Based on the calculated risk falling below a risk threshold, the controller 130 can generate and transmit a notification to a human operator to service the battery tray 120 when a detected risk level is below a threshold risk level.

10. System Installation

The exemplary system 100 can be installed and secured within various types of battery storage containers 110. During installation, the system 100 can be positioned within the battery storage container 110, for example, based on an arrangement of the set of battery cells 122 within the battery storage container 110. In one example, the set of battery cells 122 can be vertically arranged within the battery storage container no, and the system 100 can be secured to a ceiling of the battery storage container 110, such that the system 100 directs the fluid spray pattern from the nozzle 114 downward, onto, and in between the set of battery cells 122 (e.g., to improve movement of the fluid throughout the battery storage container no and reach surfaces of the set of battery cells 122). In another example, the set of battery cells 122 can be horizontally stacked within the battery storage container no, and the system 100 can be secured to a side wall of the battery storage container no, such that the system 100 directs the fluid spray pattern from the nozzle 114 toward a side of the set of battery cells 122 and in order to reach surfaces of the set of battery cells 122.

In one variation, the system 100 can be secured to an outside surface of a battery storage container no, for example, given limited space within the battery storage container no and/or for improved access to an external fluid storage tank. In this variation, a set of perforations can be cut into the surface of the battery storage container no during installation of the system 100, each perforation configured to receive a nozzle 114 such that the outlet of the nozzle 114 enters an internal environment of the battery storage container 110 containing the set of battery cells 122.

The system 100 can be installed in conjunction with additional systems 100 to create a network of systems 100 that can communicate with each other in order to prevent fire and heat propagation between adjacent battery storage containers no and can supplement fire suppression fluid (e.g., via connecting pipes) to adjacent systems 100 as needed to suppress a fire event at a particular battery storage container 110. For example, a first system 100 of a first battery storage container 110 with an ongoing fire event can transmit a fire event warning prompt to a second system 100 of an adjacent battery storage container 110 to activate a fire suppression response and facilitate cooling within the adjacent battery storage container no in order to decrease the ambient temperature and minimize thermal runaway between battery storage containers 110.

Furthermore, an individual system 100 can include a particular specification for an energy rating of a battery energy storage system (BESS)—for example, one system 100 is suitable for up to a specified number of megawatt-hours (MWh), such as 4 MWh. Accordingly, more than one system 100 can be installed on or in an individual battery storage container no in order to match the rating requirements of the set of battery cells 122 stored within the battery storage container no.

11. Battery Tray and Container Configuration

In another example implementation, the system 100 can be integrated within a device and/or system containing a set of battery cells 122. For example, the system 100 can be fully integrated within the battery storage container no enclosing the set of battery cells 122. In this example, the battery storage container no can include: a fluid storage tank for storing a volume of fire suppression fluid and mounted within the battery storage container 110; a cooling channel 151 mounted across an internal surface of the battery storage container no and having a lumen disposed between a proximal end and a distal end of the cooling channel 151, the proximal end connected to the fluid storage tank; a nozzle 114 positioned at the distal end of the cooling channel 151, the nozzle 114 including an inlet connected to the cooling channel 151 and an outlet positioned to direct a fluid spray pattern toward the set of battery cells 122; a meltable plug arranged over the outlet of the nozzle 114 and configured to melt and expose the outlet in response to an ambient temperature surrounding the system exceeding a threshold temperature; a flow detection sensor 113 configured to detect a flow of fluid from the fluid storage tank, into the cooling channel 151, and out of the outlet of the nozzle 114; and a controller 130 configured to, in response to the flow detection sensor 113 detecting the flow of fluid through the outlet of the nozzle 114, transmit a warning prompt to a remote monitoring system. Moreover, the battery storage container no can include a set of cooling channel 151s—each fluidly connected to the fluid storage tank—with a corresponding set of nozzle 114s mounted across the internal surfaces of the battery such that the set of nozzle 114s can direct a fluid spray pattern at different locations (e.g., top portion, bottom portion, side surfaces, corners) within the battery storage container no. Additionally, the battery storage container no can include a valve inset into a wall of the battery storage container no such that an external fluid supply can be connected—via a pipe or hose—to supplement the fluid stored within the integrated fluid storage tank.

Further, a set of battery storage containers no within an integrated system 100 can be arranged into an array of battery storage containers no within a field (i.e., a "multi-container field"). For example, a pipe or hose can connect a first valve on a first battery storage container 110 and a second valve on a second battery storage container 110. In another example, a controller 130 of a first battery storage container no and a controller 130 of a second battery storage container no can directly or remotely communicate, such that the controller 130 of the first battery storage container no with an ongoing fire event can transmit a fire event warning prompt to the controller 130 of the second battery storage container no in order to activate a fire suppression response and facilitate cooling within the second battery storage container no. Accordingly, each battery storage container no can be linked to adjacent battery storage containers 110 to: supplement fluid to battery storage containers no with active fire events; activate the integrated fire suppression system of battery storage containers no adjacent a battery storage container no with an active fire event; and mitigate the spread of the fire and heat.

11.1 Waste Tank

Figure 3:
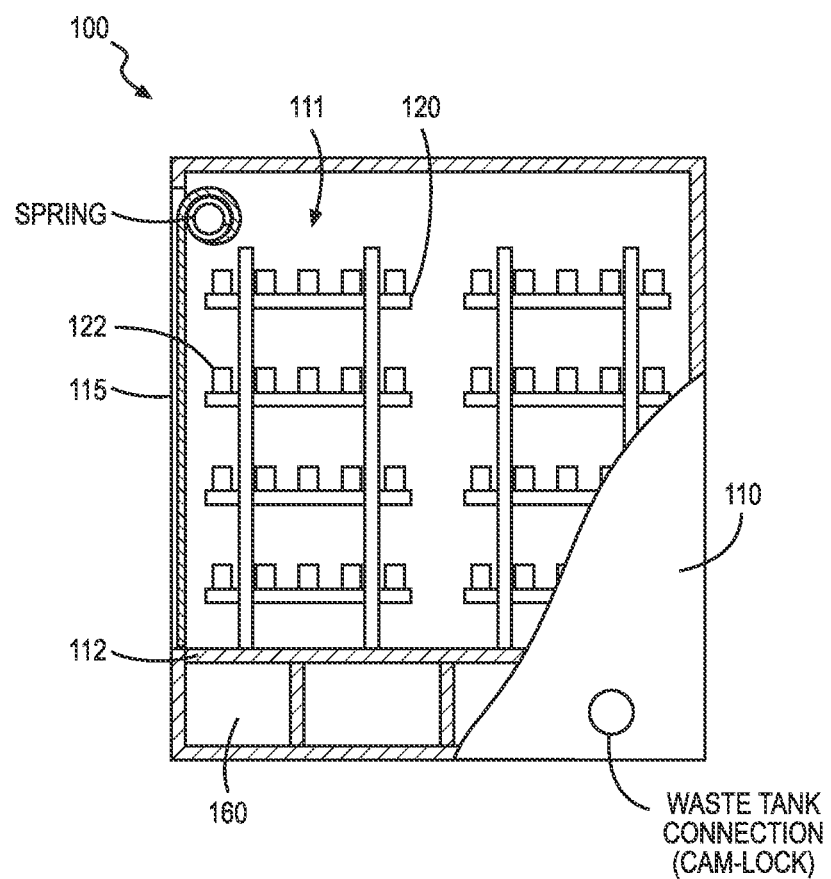
FIG. 3 is a schematic representation of a variation of the system.

As shown in FIGS. 3 and 5, The system 100 can further include an integral waste tank 160 located within the battery storage container no—such as in the bottom of the battery storage container no and between the base and the floor of the storage chamber—and configured to collect fluid runoff from fluids deposited within the storage chamber in response to a fire event.

In one implementation, the system 100 includes: a set of vertical supports arranged within the bottom of the battery storage container no; and a grate arranged above the vertical supports to cover a volume in the base of the battery storage container no and to form a rigid structure configured to support other elements of the system 100 above this volume. The volume under the grate in the base of the battery storage container 110 forms the waste tank, and other elements within the battery storage container 110 can be arranged on and/or attached to the grate such that fluid runoff from a fire event within the battery storage container no drains into and is stored in this waste tank. The system can further include a pipe connection positioned on the exterior of the battery storage container 110 and connected to the waste tank, such as in the form of a sump passing through a wall of the battery storage container no above the grate and extending downwardly into the waste tank 160 to enable contents of the waste tank 160 to be pumped out of the battery storage container no and reducing opportunity of leaks (e.g., due to faulty seals or drain plug installation).

In another implementation, the system 100 includes an external waste tank 160 arranged beneath, and fluidly coupled to, the battery storage container no. Generally, during installation of the system 100, the waste tank 160 is first installed, such as bolted or otherwise affixed to a concrete pad in a field, and the container is then installed above the waste tank. In this implementation, the container can include a perforated floor 112 and the waste tank 160 can include a perforated ceiling or an open top connected to the bottom of the container. In another implementation, the container and waste tank 160 can be fluidly coupled via a drain and a set of interconnecting pipes.

By collecting the fluid runoff from the battery storage container no, the system can reduce risk of environmental contamination by fluid runoff, by-products of a fire event, or fire suppression agents (e.g., fire-retardant chemicals) consumed or deployed during a fire event in the battery storage container no. For example, the waste tank 160 can define a volume greater than a target maximum volume of fluid allocated for response to a fire event within a target quantity (e.g., three) of battery storage containers 110 or slightly (e.g., 10%) greater than a volume of fire suppression materials stored onboard the battery storage container 110.

For example, in response to detecting a fire event, the controller 130 activates the cooling system to pump 155 or deposit a volume of fluid within the battery storage container 110. This fluid reduces temperatures of structures within the battery storage container 110; flows downwardly—under gravity—through the grate; and collects in the waste tank 160 in the base of the battery storage container 110. Furthermore, this fluid may collect contaminants—such as carbon, dissolved gasses, or other by-products of combustion or reaction with battery cells 122—as this fluid flows into the waste tank. The waste tank 160 can therefore retain the contaminants away from racks, battery cells 122, and other structures above the grate to prevent further contaminations within the battery storage container 110. (The waste tank 160 can also be coated with a polymer or other coating robust to such contaminants.) Later, the waste tank 160 can be pumped or drained to remove this fluid.

Further, the waste tank 160 (and any coating applied to the interior) can be configured to resist a temperature of a fully developed fire in the container, thereby preventing the waste tank 160 from melting, rupturing, deforming, or otherwise failing, and thereby causing the waste tank 160 to release contained fluid into the external environment. In one variation in which the contents of the container are exceptionally volatile, the waste tank 160 is configured to resist a maximum temperature of a conflagration within the container capable of consuming the entire contents of the container. In this variation, the waste tank 160 is configured to withstand a total catastrophic loss of the battery storage container 110, without releasing solid or liquid contaminants from the waste tank 160 into the surrounding environment, thereby reducing environmental contamination when a fire event cannot be suppressed and a majority of the battery storage container 110 and its contents are destroyed.

In one implementation, the waste tank 160 works in conjunction with a container including a perforated floor, and a battery tray 120 including a perforated or otherwise fluid-permeable base configured to release fluid from the battery tray 120 in order to capture contaminated fluid runoff from the battery tray 120. Generally, after fluid is directed into the battery tray 120, to cool the set of battery cells 122, the perforated tray base 126 releases fluid cells into the space below the battery tray 120, the fluid carrying heat away from the set of battery cells 122 and thereby increasing cooling. In particular, a perforated tray base 126 is applicable for a set of battery cell 122 which are best cooled by moving fluid. Fluid released through the perforated tray base 126 is then captured by the waste tank 160 arranged below the perforated floor 112 of the container.

For example, the system 100 can include: a battery tray 120 including a perforated tray base 126 configured to release fluid from the battery tray 120 to carry thermal energy away from the set of battery cells 122 occupying the battery tray 120; and a container configured to enclose the battery rack 11 including a perforated floor. The perforated floor 112 is arranged below the battery rack 11. The system further includes a waste tank 160 arranged below the container; defining a fluid capacity; and configured to receive fluid from the container via the perforated floor.

In one variation wherein a first battery tray 120 including a perforated tray base 126 is arranged in a battery rack 111 above a second battery tray 120, the system 100 can further include a catch basin, arranged below the perforated tray base 126 of the first battery tray 120, and configured to receive fluid from the first battery tray 120. The catch basin can be further configured to direct fluid into a tube, drain, or onto the perforated floor, away from the second battery tray 120. In another variation, the system 100 is configured to direct fluid into the first battery tray 120 including the perforated tray base 126 after the first battery tray 120 is ejected from the battery rack 111. Fluid released from the first battery rack 111 via the perforated tray base 126 drains directly onto the perforated floor 112 of the container and is captured by the waste tank.

Therefore, the system 100 can capture fluid runoff from the container, including fluid released by nozzles 114 arranged within the container, and external fluids such as fire suppressants, introduced into the container from external sources (e.g., a fire suppressant fluid directed into the container by a firefighting team.) The system 100 can capture and isolate fluid that can contain contaminants or chemicals harmful to or undesirable in the external environment within the waste tank. The inner surface of the waste tank 160 can also be configured to resist adverse reactions with fluid or contaminants, thereby enabling a firefighting team to effectively suppress a fire event in the container without limiting application of fire suppressant fluids or chemicals. The waste tank 160 can be further configured to isolate fluid for an extended period of time, and therefore be emptied at a time following suppression of the fire event, when the risk to a human of approaching the container is below a risk threshold.

11.2 Interconnected Waste Tanks

In one variation as shown in FIG. 5, in which a first battery storage container 110 is located proximal a second battery storage container 110, the first waste tank 160 of the first battery storage container 110 can be connected via a pipe to a second waste tank 160 of a second battery storage container 110. In this configuration, the first waste tank 160 fills with fluid during a fire event, such as when additional fluid is deposited in the battery storage container 110 (i.e., by a firefighting team responding to the fire event). This fluid can then flow from the first waste tank, through the pipe, into the second waste tank. The second waste tank 160 can therefore function as an overflow waste tank 160 for the first battery storage container 110, thereby preventing fluid from over-topping and spilling out of the first waste tank 160 and contaminating the environment external to the first battery storage container 110.

For example, the system 100 can include a first waste tank, arranged below a first container, defining a first fluid capacity, and configured to receive fluid from the first container via a perforated floor. The system 100 can further include a second waste tank: arranged external to the first container; defining a second fluid capacity; fluidly coupled to the first waste tank; and configured to receive fluid from the first waste tank 160 in response to the first waste tank 160 receiving a volume of fluid greater than the first fluid capacity.

In another implementation, the second waste tank 160 can be a self-contained waste tank 160 arranged external to the first waste tank, disconnected from a second battery storage container 110. In another implementation, an array of waste tanks, each fluidly coupled to a battery storage container no, can be fluidly interconnected to share fluid directed into a first battery storage container 110 amongst the array of waste tanks, increasing the volume of fluid that can be introduced into the first battery storage container no during suppression of a fire event.

Therefore, a battery storage container no can be coupled to a first waste tank, the first waste tank 160 further interconnected to a second waste tank, enabling the first battery storage container no to receive a volume of fluid greater than the fluid capacity of the first waste tank 160 without releasing contaminated fluid into the external environment. Additional fluid capacity can enable a response team, such as a firefighting team, to introduce a greater amount of fire suppressants to suppress a fire event in the battery storage container 110 without releasing potential contaminants.

12. Explosion Mitigation

Figure 2:
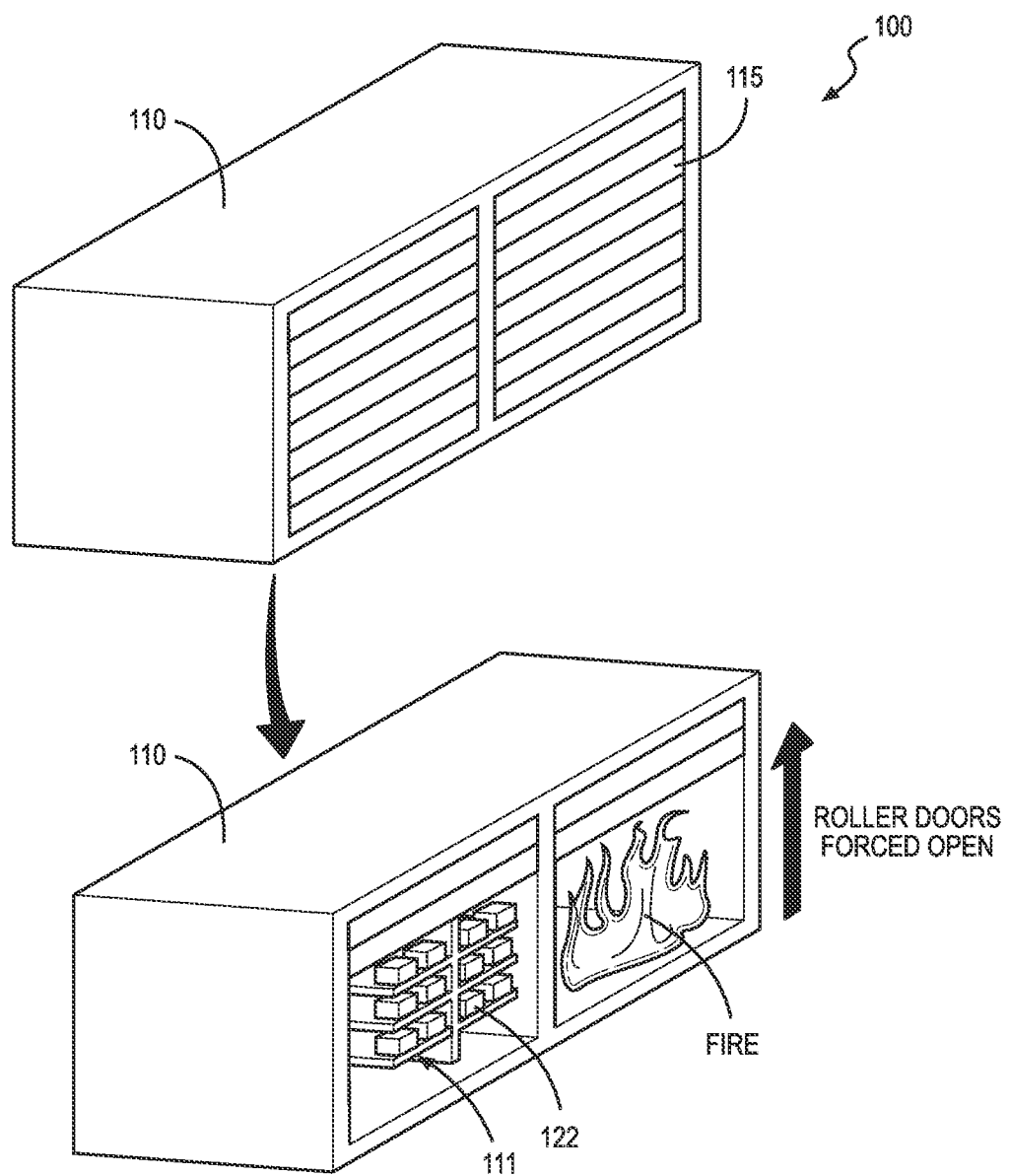
FIG. 2 is a flowchart representation of a method.
Figure 7:
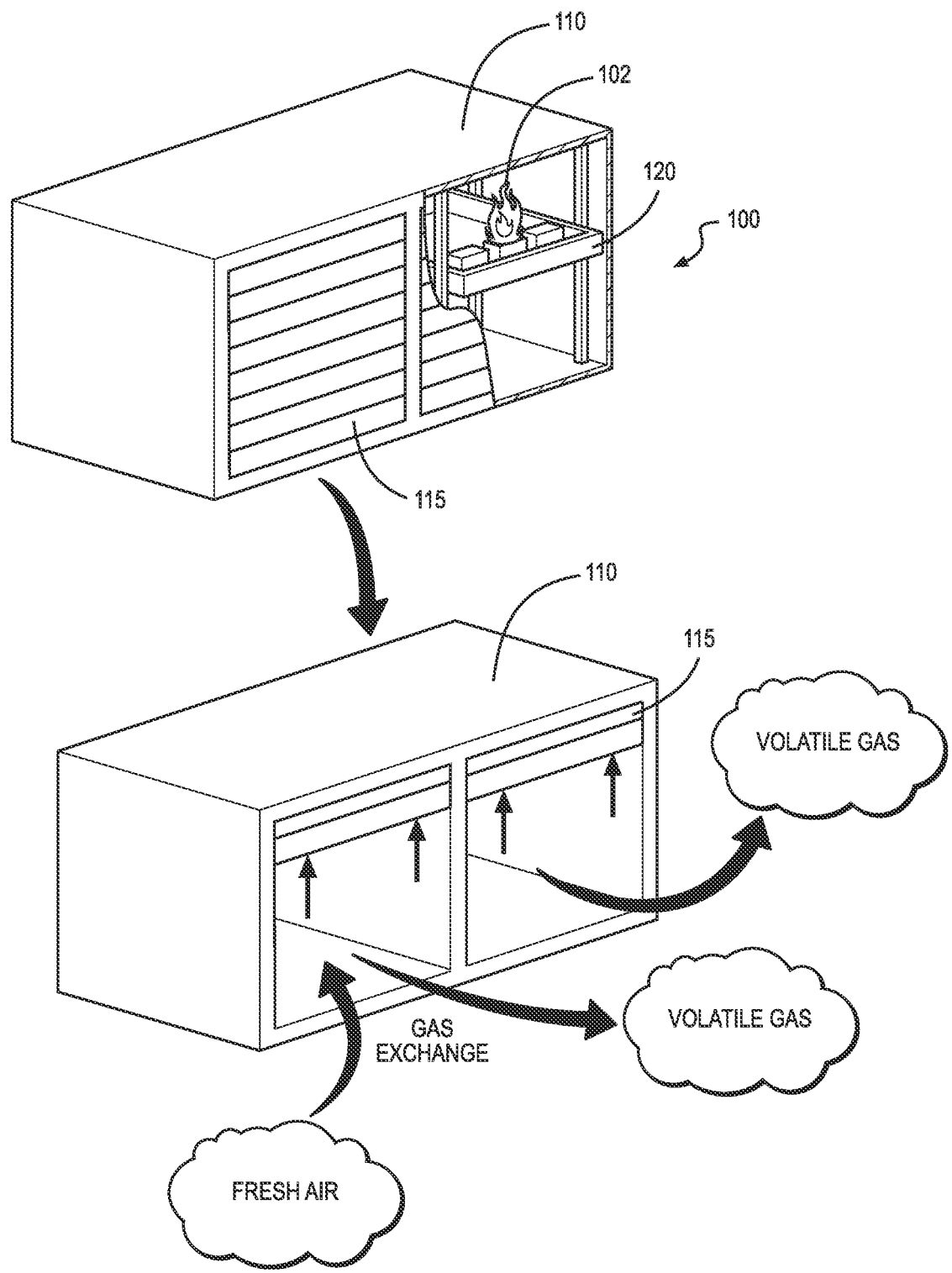
FIG. 7 is a flowchart representation of one variation of the method.

As shown in FIGS. 2 and 7, The system 100 can further include a door 115 arranged at the perimeter wall of the housing of the battery storage container 110 and can be configured to open when the controller 130 detects a change in ambient conditions within the storage chamber indicative of a potential explosive event such as the detection of hazardous gasses (i.e., hydrogen, methane, hydrocarbons, carbon monoxide.)

For example, the system 100 can include the sensor 113, configured to detect a precursor condition 102 to an incipient explosion event in the container, and the door 115 configured to transition from the closed position to the open position in response to the detection of the precursor condition 102 in the container. The door 115 transitioning to the open position exposes the interior of the container to the exterior environment, thereby venting any gasses in the interior of the container to the exterior atmosphere.

In one implementation, the system can include an actuator (e.g., a spring mechanism, a piston) mounted between the door 115 and the housing. when the door 115 is closed, the actuator is under tension. When the actuator extends, the door 115 is forced by the actuator into the open position.

In another implementation, the system includes an electronically-controllable retention mechanism—such as an electromagnetic latch or an electrical fusible link—mounted between the door 115 and the housing and configured to retain the door 115 in the closed position. The retention mechanism is controllable by the controller 130 and can be released in response to detection of an increase in the concentration of gases within the unit. The door, actuator, and retention mechanism are arranged in a fail-safe configuration, in which a loss of power causes the retention mechanism to release, thereby causing the door 115 to open under the force of the actuator.

Upon release of the retention mechanism, the door 115 opens under the force of the actuator, exposing the interior of the storage chamber to the ambient atmosphere and venting the gases within the storage chamber, thereby preventing an increase in the volume and pressure of flammable gas within the storage chamber that could lead to an explosive event and/or potential rupture or destruction of the storage chamber.

In another implementation wherein the container cannot accommodate a door 115 arranged in the container sidewall, the container can include an operable vent, configured to transition between a closed state, isolating the interior and exterior of the container, and an open state, exposing the interior of the container to the external environment. The vent defines an area proportionate to the volume of the container to provide a volume of airflow through the vent to replace the volume of gas in the container within a minimum time (e.g., less than 60 seconds) to prevent a buildup of volatile gasses within the container during a period of time between a first time when the precursor condition 102 is detected, and a second time when sufficient gas exchange can occur to reduce the concentration of volatile gas below a threshold concentration.

The system 100 can actively detect a potential explosive event within a battery tray 120 by monitoring outputs of multiple sensors including a gas sensor, pressure sensor, humidity sensor, and/or a temperature sensor. The controller 130 can activate the retaining mechanism to release the door 115 in response to a sensor 113 detecting a change in ambient conditions within the battery storage container 110 that precede an explosive event, such as detecting elevated temperatures, gas production, detecting smoke, and/or specific gas constituents.

For example, the system 100 can include: the container configured to enclose the battery rack 111; a sensor 113 configured to detect presence of a volatile gas indicating an incipient explosion event in the container; and the door 115 arranged in the container opening in the sidewall of the container. The door 115 is configured to: seal the container opening, isolating the interior of the container from the exterior of the container in the closed position; expose the container interior to the container exterior in the open position; and transition from the closed position to the open position in response to detection by the sensor 113 of the presence of the gas indicating an incipient explosion event in the container.

In this example, the system is configured to detect the presence of a volatile gas in the battery storage container 110 that is not present during nominal operating conditions of the set of battery cells 122. The sensor 113 can be configured to detect a particular volatile gas indicating an incipient explosion event based on the characteristics of the particular battery cells 122 in the container. In response to detection of the presence of the particular volatile gas, the controller 130 can detect a precursor condition 102 to an incipient explosion and trigger the door 115 to open, thereby venting the volatile gas to the exterior of the battery storage container 110.

In another variation in which the system 100 detects presence of a flammable gas in the container, in addition to triggering the door 115 to transition from the closed position to the open position, the controller 130 is further configured to cut power to the battery storage container 110 to reduce the possibility of electrical shorts in the container with the potential to generate a spark capable of igniting the flammable gas and causing an explosion in the container.

In another variation of this example, the system 100 includes a sensor 113 configured to detect a volatile gas concentration within the container greater than a threshold gas concentration. The controller 130 is configured to: receive a signal from the sensor 113; detect the signal as a precursor to an explosion event; and, in response to detecting the precursor to the explosion event, trigger the door 115 to transition from the closed position to the open position.

In this implementation, the system 100 is configured to detect an increased concentration of a particular volatile gas or a particular set of volatile gasses that can be present in the container during nominal operating conditions in trace amounts and/or in concentrations below an operating threshold concentration. The system 100 is configured to detect an increase in concentration of the particular volatile gas beyond the operating threshold concentration and, in response, initiate a mitigation action (such as triggering the door 115 to transition to the open position) to reduce the concentration of the volatile gas prior to the occurrence of an explosion event. In one variation of this implementation, the system 100 can be configured to detect a concentration of a first volatile gas, nominally non-reactive in the battery storage container 110, and a concentration of a second volatile gas reactive with the first volatile gas, the concentration of the first volatile gas and the concentration of the second volatile gas representing a precursor condition 102 to an explosion event.

After the door 115 has been opened, the controller 130 can continue to monitor the ambient conditions within the battery storage container 110. More specifically, the controller 130 can monitor the gas concentration, pressure, and constituents within the storage chamber and record these data in a remote database. In one variation in which the controller 130 is configured to automatically alert and/or dispatch a fire department to the location of the battery storage container 110, the controller 130 can transmit the data to the emergency responders en route to the battery storage container 110.

For example, the controller 130 can release the door 115 in response to the detection of flammable and/or explosive gasses within the battery storage container 110, which can be products of battery cell 122 failure such as hydrogen, methane, or hydrocarbons. By releasing the door 115 and venting these gasses to the ambient atmosphere upon detection, the system prevents the buildup of flammable/explosive gasses within the confined environment of the battery storage container 110, thereby reducing the possibility of ignition of concentrated flammable/explosive gasses in a confined space and possible explosion. Further, the controller 130 releases the door 115 in response to gas concentration below the lower flammability limit to prevent a dangerous buildup of flammable/explosive gasses. Generally, firefighters will not approach a scene if the concentration of gasses were to exceed the lower flammability limit, as it presents too great a hazard to the firefighters. Therefore, by releasing the door 115 upon detection of flammable/explosive gasses and venting them to the ambient atmosphere, the system prevents a situation in which firefighters cannot approach a scene to mitigate the fire event.

In a related example, the system 100 is configured to open the door 115 to release gasses within the container to the atmosphere and eject a battery tray 120 exhibiting a precursor condition 102 or a fire event. In this example, the system 100 can include: a battery rack 111 configured to support a first battery tray 120 and a second battery tray 120; the container configured to enclose the battery rack 111; and the door, arranged in an opening in the container sidewall, and configured to transition from the closed position to the open position. In response to a precursor condition 102 detected in the first battery tray 120 by the sensor 113, the door 115 transitions from the closed position to the open position, and the first battery tray 120 is extended from the battery rack 111 through the container opening. Extending the battery tray 120 through the opening in the container increases the distance between the set of battery cells 122 in the first battery tray 120 and a second set of battery cells 122 in the second battery tray 120. Additionally, extending the first battery tray 120 through the opening in the battery storage container no enables a firefighting team to approach and suppress the fire event from additional sides.

In one variation, the controller 130 can activate the retaining mechanism to release the door 115 in response to a sensor 113 detecting a change in ambient conditions within the battery storage container no that precede an explosive event, such as detecting an increase in the temperature within the storage chamber beyond a threshold (i.e., beyond 100 degrees Celsius)

In another variation, the door 115 is mounted within the perimeter wall of the housing such that the gravitational force on the door 115 forces the door 115 into the open position and the retention mechanism holds the door 115 in the closed position. In another variation, a weight is attached to the door 115 mechanism such that the gravitational force on the weight forces the door 115 into the open position and the retention mechanism holds the door 115 in the closed position.

Therefore, the system 100 can detect various precursor conditions 102 indicative of an incipient or imminent explosion event in the battery storage container 110 and initiate mitigation actions to slow or prevent progression to an explosion within the battery storage container 110. Generally, the system is configured to detect a precursor condition 102 and execute a mitigation action to suppress the precursor condition 102 before progression to an explosion event. Additionally, the system can be configured to execute mitigation actions in a sequence of increasing potency and/or destructiveness to increase the probability of preventing progression to the explosion event, while protecting a maximum number of elements of the system 100 not exhibiting a precursor condition 102 from secondary damage caused by the mitigation action.

14. Additional Applications

In yet another example, the system 100 can be integrated within a battery and/or hybrid electric vehicle, which use lithium battery cells 122 to power an electric motor of the vehicle. In this example, the electric vehicle can include: a cooling channel 151 that is configured to receive a fire suppression fluid (e.g., water vapor); and a nozzle 114 positioned at the distal end of the cooling channel 151, the nozzle 114 including an inlet connected to the cooling channel 151 and an outlet positioned to direct a fluid spray pattern toward a battery of the vehicle; and a controller 130 configured to detect the presence of a fire event of the battery within the vehicle. The controller 130 can further be configured to transmit a warning prompt to a dashboard display of the vehicle to notify a driver of the vehicle and/or a remote monitoring system in order to notify a manufacturer of the vehicle and/or a fire department service. In one variation of this example implementation, the vehicle can include an onboard fluid storage tank in order to store and distribute the fire suppression fluid. Alternatively, the vehicle can include a fluid inlet that receives and directs externally provided fluid (e.g., water from a fire truck) into the cooling channel 151, through the nozzle 114, and to the battery cells 122.

In yet another example implementation, the system 100 can be configured to affix to a system with an existing cooling and fluid distribution apparatus (e.g., HVAC system). In this example, the system 100 can include: a cooling channel 151; and a nozzle 114 positioned to direct a fluid spray pattern at a power source of the system within the existing cooling system. Thus, the system 100 can integrate into the structure (e.g., power, sensor 113s, distribution) of the existing cooling apparatus and provide additional fire protection for assets serviced by the existing cooling apparatus.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of an owner computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for detecting and mitigating a fire within a battery storage container comprising:
   a first battery rack;
   a first sensor configured to detect a precursor condition to an incipient fire event in the first battery rack;
   a first battery tray:
      configured to retain a first set of battery cells;
      occupying the first battery rack in an inserted position; and
      extending out of and supported by the first battery rack in an extended position;
   a first tray ejector configured to transition the first battery tray from the inserted position to the extended position in response to detection of the precursor condition in the first battery rack;

a first intercooler:
  arranged in the first battery tray; and
  comprising a first cooling channel configured to circulate a fluid to cool the first set of battery cells occupying the first battery tray;
a supply manifold arranged proximal the first battery rack, fluidly coupled to the first intercooler, and configured to supply the fluid to the first intercooler;
a return manifold arranged proximal the first battery rack, fluidly coupled to the first intercooler, and configured to receive the fluid from the first intercooler; and
a first nozzle:
  fluidly coupled to the supply manifold;
  arranged in the first battery tray; and
  configured to receive the fluid from the supply manifold and direct the fluid into the first battery tray in response to detection of the precursor condition in the first battery rack.

2. The system of claim 1:
wherein the first sensor is arranged in the first battery rack adjacent the first battery tray; and
further comprising:
  a second battery tray:
    configured to retain a second set of battery cells;
    occupying the first battery rack in an inserted position; and
    extending out of and supported by the first battery rack in an extended position;
  a second sensor arranged in the battery rack adjacent the second battery tray and configured to detect the precursor condition;
  a second tray ejector configured to transition the second battery tray from the inserted position to the extended position in response to detection of the precursor condition;
  a second intercooler:
    arranged in the second battery tray; and
    comprising a second cooling channel configured to circulate the fluid to cool the second set of battery cells occupying the second battery tray;
  a second nozzle:
    fluidly coupled to the supply manifold;
    arranged in the second battery tray; and
    configured to receive the fluid from the supply manifold and direct the fluid into the second battery tray in response to detection of the precursor condition; and
  a controller configured to:
    receive a first signal from the first sensor and a second signal from the second sensor;
    detect the precursor condition in the first battery tray based on the first signal; and
    in response to detecting the precursor condition in the first battery tray:
      trigger the first tray ejector to transition the first battery tray from the inserted position to the extended position; and
      trigger the first nozzle to direct the fluid into the first battery tray to suppress the precursor condition in the first battery tray.

3. The system of claim 2:
wherein the first sensor is configured to:
  detect a temperature of a first battery cell, in the first set of battery cells, occupying the first battery tray; and
  transmit the first signal to the controller; and
wherein the controller is configured to:
  receive the first signal from the first sensor;
  detect the temperature of the first battery cell exceeding a threshold temperature based on the first signal; and
  in response to detecting the temperature of the first battery cell exceeding the threshold temperature in the first battery tray:
    trigger the first tray ejector to transition the first battery tray from the inserted position to the extended position; and
    trigger the first nozzle to direct the fluid into the first battery tray to suppress the precursor condition in the first battery tray.

4. The system of claim 2 wherein:
the first sensor is configured to detect a pressure of a first battery cell, in the first set of battery cells, occupying the first battery tray; and
the controller is configured to:
  receive the first signal from the first sensor;
  detect the pressure of the first battery cell exceeding a threshold pressure based on the first signal; and
  in response to detecting the pressure of the first battery cell exceeding the threshold pressure in the first battery tray:
    trigger the first tray ejector to transition the first battery tray from the inserted position to the extended position; and
    trigger the first nozzle to direct the fluid into the first battery tray to suppress the precursor condition in the first battery tray.

5. The system of claim 2:
further comprising:
  a third battery tray:
    configured to retain a third set of battery cells;
    occupying a second battery rack in an inserted position; and
    extending out of and supported by the second battery rack in an extended position;
  a third sensor:
    arranged external to the first battery rack and the second battery rack; and
    configured to detect a temperature within the third battery tray; and
  a third tray ejector configured to transition the third battery tray from the inserted position to the extended position; and
wherein the controller is further configured to:
  receive a third signal from the third sensor;
  detect the precursor condition in the third battery tray based on the third signal; and
  in response to detecting the precursor condition in the third battery tray, trigger the third tray ejector to transition the third battery tray from the inserted position to the extended position.

6. The system of claim 1:
further comprising:
  a power bus arranged in the first battery rack adjacent the first battery tray; and an electrical disconnect:
    electrically coupled to and interposed between the power bus and the first set of battery cells within the first battery tray, and
    configured to:
      in a coupled state, electrically couple the power bus to the first set of battery cells;
      in a decoupled state, electrically disconnect the power bus from the first set of battery cells; and
      transition from the coupled state to the decoupled state; and a controller configured to trigger the electrical disconnect to transition from the coupled state to the decoupled state in response to detection of the precursor condition in the first battery tray.

7. The system of claim 1:
further comprising:
a container configured to enclose the first battery rack; and
a door:
arranged in a container opening in a sidewall of the container; and
configured to:
seal the container opening, isolating an interior of the container from an exterior of the container in a closed position;
expose the container interior to the container exterior in an open position; and
transition from the closed position to the open position; and
wherein the first battery tray is configured to extend out of the first battery rack through the container opening.

8. The system of claim 7, wherein:
the first sensor is configured to detect a precursor condition to an incipient explosion event in the container; and
the door is configured to transition from the closed position to the open position in response to the detection of the precursor condition to an incipient explosion event in the container.

9. The system of claim 8:
wherein the first sensor is configured to detect a volatile gas concentration within the container; and
further comprising a controller configured to:
receive a signal from the first sensor;
detect the signal as a precursor to an explosion event; and
in response to detecting the precursor to the explosion event, trigger the door to transition from the closed position to the open position.

10. The system of claim 1:
wherein the first cooling channel further defines a set of apertures configured to release fluid from the first cooling channel into the first battery tray; and
further comprising a set of meltable plugs, each meltable plug in the set of meltable plugs configured to:
insert into an aperture in the first cooling channel;
seal the aperture when a temperature of the first battery tray is maintained below a threshold temperature, retaining fluid within the first cooling channel; and
melt in response to the temperature in the first battery tray exceeding the threshold temperature, releasing the fluid into the first battery tray.

11. The system of claim 1:
wherein the first cooling channel further defines a set of apertures configured to release fluid from the first cooling channel into the first battery tray; and
further comprising:
a set of pressure sensitive plugs, each pressure sensitive plug in the set of pressure sensitive plugs configured to:
insert into an aperture in the first cooling channel;
seal the aperture when a pressure of fluid in the first cooling channel is maintained below a threshold pressure, retaining fluid in the first cooling channel; and
eject from the aperture in response to the pressure of fluid in the first cooling channel increasing to greater than the threshold pressure, releasing fluid into the first battery tray; and
a pump:
fluidly coupled to the first intercooler; and
configured to increase the pressure of fluid in the first cooling channel above the threshold pressure in response to detection of the precursor condition by the first sensor.

12. The system of claim 1:
further comprising a directional control valve:
fluidly coupled to and interposed between:
the supply manifold and the first intercooler; and
the supply manifold and the first nozzle; and
configured to:
in a first state, receive fluid from the supply manifold and direct fluid to the first intercooler; and
in a second state, receive fluid from the supply manifold and direct fluid to the first nozzle; and
wherein triggering the first nozzle to direct fluid into the first battery tray comprises triggering the directional control valve to transition from the first state to the second state.

13. The system of claim 1:
further comprising a second nozzle:
arranged above the first battery rack and laterally offset from the first battery rack; and
configured to direct fluid into the first battery tray when the first battery tray is in an ejected position; and
wherein:
at a first time, the first sensor is configured to detect the precursor condition to the incipient fire event;
at a second time following the first time, the first battery tray is configured to eject from the first battery rack; and
at a third time following the second time, the second nozzle is configured to release fluid into the first battery tray.

14. The system of claim 13:
wherein the first battery tray further defines a perforated base configured to release fluid from the first battery tray; and
further comprising:
a first container:
configured to enclose the first battery rack; and
comprising a perforated floor:
arranged below the first battery rack; and
configured to release fluid through the floor;
a first waste tank:
arranged below the first container;
defining a first fluid capacity; and
configured to receive fluid from the first container via the perforated floor; and
a second waste tank:
arranged external to the first container;
defining a second fluid capacity;
fluidly coupled to the first waste tank; and
configured to receive fluid from the first waste tank in response to the first waste tank receiving a volume of fluid greater than the first fluid capacity.

15. A system for detecting and mitigating a fire within a battery storage container comprising:
at a battery tray arranged within a battery rack:
retaining a set of battery cells within the battery tray; and
circulating a fluid through an intercooler arranged within the battery tray to cool the set of battery cells occupying the battery tray;

at a directional control valve fluidly coupled to a supply manifold, the intercooler and a nozzle arranged within the battery tray:
receiving fluid from the supply manifold; and
supplying fluid to the intercooler;
at a sensor arranged within the battery tray, detecting a precursor condition to an incipient fire event in the first battery tray;
in response to detection of the precursor condition by the sensor, extending the battery tray from the battery rack;
in response to detection of the precursor condition by the sensor, controlling the directional control valve to transition from a first state supplying fluid to the intercooler, to a second state supplying the fluid to the nozzle; and
at a controller:
receiving a signal from the sensor indicating detection of the precursor condition to an incipient fire event by the sensor;
in response to receiving the signal from the sensor, generating a notification indicating the precursor condition present in the battery tray; and
transmitting the notification to an operator.

16. A system for detecting and mitigating a fire within a battery storage container comprising:
a first battery rack;
a first battery tray:
configured to retain a first set of battery cells;
occupying the first battery rack in an inserted position; and
extending out of and supported by the first battery rack in an extended position;
a first sensor configured to:
at a first time preceding ejection of the first battery tray from the first battery rack, detect a first temperature within the first battery tray below a threshold temperature;
at a second time following the first time, detect a second temperature within the first battery tray exceeding the threshold temperature; and
at a third time following the second time and following ejection of the first battery tray from the first battery rack, detect a third temperature within the first battery tray falling below the threshold temperature; and
a controller configured to:
at a fourth time following the second time and preceding the third time:
receive a first signal, from the first sensor, following detection of the second temperature in the first battery tray; and
detect a first precursor condition in the first battery tray based on the first signal;
at a fifth time following the third time, receive a second signal from the first sensor;
calculate a risk value of a human approaching the first battery tray based on the second signal, a composition of the first set of battery cells, and a difference between the fifth time and a present time;
detect the risk value falling below a threshold risk value; and
in response to detecting the risk value falling below the threshold risk value:
generate a prompt to approach the first battery tray and replace the first set of battery cells in the first battery tray, including the risk value; and
transmit the prompt to an operator; and a first tray ejector configured to transition the first battery tray from the inserted position to the extended position in response to detection of the first precursor condition in the first battery tray.

17. The system of claim 16:
further comprising a container configured to enclose the first battery rack;
wherein the controller is configured to detect presence of a volatile gas indicating an incipient explosion event in the container; and
further comprising a door:
arranged in a container opening in a sidewall of the container; and
configured to:
seal the container opening, isolating an interior of the container from an exterior of the container in a closed position;
expose the container interior to the container exterior in an open position; and
transition from the closed position to the open position in response to detection of the presence of the gas indicating an incipient explosion event in the container by the controller.

18. The system of claim 16:
further comprising:
a first nozzle:
arranged within the first battery tray; and
configured to direct fluid into the first battery tray;
a second battery tray:
arranged adjacent to the first battery tray;
configured to retain a second set of battery cells;
occupying the first battery rack in an inserted position; and
extending out of and supported by the first battery rack in an extended position;
a second sensor;
a second tray ejector configured to transition the second battery tray from the inserted position to the extended position;
a second nozzle:
arranged within the second battery tray; and
configured to direct fluid into the second battery tray;
a third battery tray:
arranged adjacent to the second battery tray;
configured to retain a third set of battery cells;
occupying the first battery rack in an inserted position; and
extending out of and supported by the first battery rack in an extended position; and
a third tray ejector configured to transition the third battery tray from the inserted position to the extended position; and
wherein the controller is configured to:
receive a first signal from the first sensor at the first time;
detect the first precursor condition to a first incipient fire event in the first battery tray at the fourth time based on the first signal;
in response to detecting the first precursor condition in the first battery tray:
trigger the first tray ejector to transition the first battery tray from the inserted position to the extended position; and
trigger the first nozzle to direct the fluid into the first battery tray to suppress the first precursor condition in the first battery tray;

receive a second signal from the second sensor at a sixth time following the fourth time;

detect a second precursor condition to a second incipient fire event in the second battery tray at a seventh time following the sixth time based on the second signal; and in response to detecting the second precursor condition in the second battery tray:

trigger the third tray ejector to transition the third battery tray from the inserted position to the extended position; and trigger the second nozzle to direct the fluid into the second battery tray to suppress the second precursor condition in the second battery tray.

19. The system of claim 16, further comprising:
a power bus arranged proximal the first battery rack; and
an electrical disconnect:
electrically coupled to and interposed between the power bus and the first set of battery cells within the first battery tray; and
configured to:
in a coupled state, electrically couple the power bus to the first set of battery cells;
in a decoupled state, physically and electrically disconnect the power bus from the first set of battery cells; and
transition from the coupled state to the decoupled state in response to ejection of the first battery tray from the first battery rack.

* * * * *